(12) United States Patent
Fukuchi et al.

(10) Patent No.: US 7,050,884 B2
(45) Date of Patent: May 23, 2006

(54) IMAGE TRANSMISSION DEVICE AND METHOD, TRANSMITTING DEVICE AND METHOD, RECEIVING DEVICE AND METHOD, AND ROBOT APPARATUS

(75) Inventors: Masaki Fukuchi, Tokyo (JP); Takayuki Yoshigahara, Tokyo (JP); Kohtaro Sabe, Tokyo (JP); Takeshi Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 10/390,143

(22) Filed: Mar. 17, 2003

(65) Prior Publication Data

US 2004/0008738 A1    Jan. 15, 2004

(30) Foreign Application Priority Data

Mar. 18, 2002  (JP)  .............................. 2002-074908

(51) Int. Cl.
*G06F 19/00* (2006.01)
(52) U.S. Cl. ...................... 700/245; 700/245; 712/200; 712/300; 375/240.1
(58) Field of Classification Search ........ 700/245–247, 700/250–251, 257, 262, 264; 370/537, 480; 725/37, 131; 348/473, 564; 715/501.1, 715/716, 760; 712/300, 200; 375/240.1
See application file for complete search history.

(56) References Cited

U.S. PATENT DOCUMENTS

| | | | | |
|---|---|---|---|---|
| 4,850,027 A * | 7/1989 | Kimmel | ...................... | 382/303 |
| 5,809,322 A * | 9/1998 | Akerib | ........................ | 712/14 |
| 5,842,033 A * | 11/1998 | Wise et al. | ..................... | 712/1 |
| 6,330,665 B1 * | 12/2001 | Wise et al. | .................. | 712/300 |
| 6,330,666 B1 * | 12/2001 | Wise et al. | .................. | 712/300 |
| 6,456,737 B1 * | 9/2002 | Woodfill et al. | ............. | 382/154 |
| 6,603,865 B1 * | 8/2003 | Yagi et al. | ................... | 382/103 |
| 6,701,524 B1 * | 3/2004 | Okamura et al. | ............. | 725/37 |
| 6,892,296 B1 * | 5/2005 | Wise et al. | ................. | 712/300 |
| 2004/0025000 A1 * | 2/2004 | Wise et al. | ................. | 712/300 |
| 2004/0208372 A1 * | 10/2004 | Boncyk et al. | ............. | 382/181 |
| 2004/0221143 A1 * | 11/2004 | Wise et al. | ................. | 712/300 |

OTHER PUBLICATIONS

Camillo et al., Structure and motion in two dimensions from multiple images: A least squares appoach, 1991, IEEE, pp. 242-777.*

Jang et al., Self-calibration of stero-camera by pure translational motion, 1996, IEEE, pp. 297-652.*

Tomatis, The PMC-FG framegrabber: A Bt848 base capture device for the XOberon/PowerPC operation system, 1999, Internet, pp. 1-37.*

* cited by examiner

*Primary Examiner*—Thomas G. Black
*Assistant Examiner*—McDieunel Marc
(74) *Attorney, Agent, or Firm*—Frommer Lawrence & Haug LLP; William S. Frommer; Thomas F. Presson

(57) ABSTRACT

An image transmission device and method, a transmitting device and method, a receiving device and method, and robot apparatus are capable of effectively transmitting the image data of multiple channels by using the existing systems which are formed on the premise of transmitting and receiving of the image data through single transmission line. At a transmitting side, the image data of multiple channels to be input is multiplexed with switching the channels by frame, and prescribed image information is added to each of the multiplexed image data of each frame. At a receiving side, the image information added to each of the image data for each frame respectively transmitted from the transmitting means are analyzed, and dividing means for dividing for each frame and outputting the multiplexed image data transmitted from the transmitting means to the corresponding channels is provided based on the analysis result.

3 Claims, 15 Drawing Sheets

| TAG1 | OUTPUT PORT NUMBER |
|---|---|
| TAG2 | INPUT PORT NUMBER |
| TAG3 | FRAME NUMBER |
| TAG4 | RESERVED |

FIG. 9

| OUTPUT PORT NUMBER | IS-1 | IS-2 | IS-3 | | IS-n |
|---|---|---|---|---|---|
| INPUT PORT NUMBER | 2 | 1 | m | | 3 |
| OUTPUT FREQUENCY R | – | 3 | 4 | | 5 |

FIG. 10

| | OUTPUT PORT | ① | ② | ③ | ④ | |
|---|---|---|---|---|---|---|
| | OUTPUT FREQUENCY REGISTER VALUE | N1= – | N2= 3 | N3= 2 | N4= 5 | |
| | COUNTER INITIAL VALUE | C1= – | C2= 3 | C3= 2 | C4= 5 | INITIALIZATION SUBSTITUTING Cx = Nx |
| FRAME NO. | OUTPUT IMAGE | | | | | |
| 1 | ① | C1= – | C2= 2 | C3= 1 | C4= 4 | OUTPUT ① AND MAKE DECREMENTS FOR C2 – C4 |
| 2 | ③ | C1= – | C2= 2 | C3= 2 | C4= 4 | OUTPUT ③ AND SUBSTITUTE C3 = N3 |
| 3 | ① | C1= – | C2= 1 | C3= 1 | C4= 3 | OUTPUT ① AND MAKE DECREMENTS FOR C2 – C4 |
| 4 | ② | C1= – | C2= 3 | C3= 1 | C4= 3 | OUTPUT ② AND SUBSTITUTE C2 = N2 |
| 5 | ③ | C1= – | C2= 3 | C3= 2 | C4= 3 | OUTPUT ③ AND SUBSTITUTE C3 = N3 |
| 6 | ① | C1= – | C2= 2 | C3= 1 | C4= 2 | OUTPUT ① AND MAKE DECREMENTS FOR C2 – C4 |
| 7 | ③ | C1= – | C2= 2 | C3= 2 | C4= 2 | OUTPUT ③ AND SUBSTITUTE C3 = N3 |
| 8 | ① | C1= – | C2= 1 | C3= 1 | C4= 1 | OUTPUT ① AND MAKE DECREMENTS FOR C2 – C4 |
| 9 | ② | C1= – | C2= 3 | C3= 1 | C4= 1 | OUTPUT ② AND SUBSTITUTE C2 = N2 |
| 10 | ③ | C1= – | C2= 3 | C3= 2 | C4= 1 | OUTPUT ③ AND SUBSTITUTE C3 = N3 |
| 11 | ④ | C1= – | C2= 3 | C3= 2 | C4= 5 | OUTPUT ④ AND SUBSTITUTE C4 = N4 |
| 12 | ① | C1= – | C2= 2 | C3= 1 | C4= 4 | OUTPUT ① AND MAKE DECREMENTS FOR C2 – C4 |
| 13 | ③ | C1= – | C2= 2 | C3= 2 | C4= 4 | OUTPUT ③ AND SUBSTITUTE C3 = N3 |
| 14 | ① | C1= – | C2= 1 | C3= 1 | C4= 3 | OUTPUT ① AND MAKE DECREMENTS FOR C2 – C4 |
| 15 | ② | C1= – | C2= 3 | C3= 1 | C4= 3 | OUTPUT ② AND SUBSTITUTE C2 = N2 |
| 16 | ③ | C1= – | C2= 3 | C3= 2 | C4= 3 | OUTPUT ③ AND SUBSTITUTE C3 = N3 |
| 17 | ① | C1= – | C2= 2 | C3= 1 | C4= 2 | OUTPUT ① AND MAKE DECREMENTS FOR C2 – C4 |
| 18 | ③ | C1= – | C2= 2 | C3= 2 | C4= 2 | OUTPUT ③ AND SUBSTITUTE C3 = N3 |
| 19 | ① | C1= – | C2= 1 | C3= 1 | C4= 1 | OUTPUT ① AND MAKE DECREMENTS FOR C2 – C4 |
| 20 | ② | C1= – | C2= 3 | C3= 1 | C4= 1 | OUTPUT ② AND SUBSTITUTE C2 = N2 |
| 21 | ③ | C1= – | C2= 3 | C3= 2 | C4= 1 | OUTPUT ③ AND SUBSTITUTE C3 = N3 |
| 22 | ④ | C1= – | C2= 3 | C3= 2 | C4= 5 | OUTPUT ④ AND SUBSTITUTE C4 = N4 |
| 23 | ① | C1= – | C2= 2 | C3= 1 | C4= 4 | OUTPUT ① AND MAKE DECREMENTS FOR C2 – C4 |

FIG. 12

IMAGE TRANSMISSION DEVICE AND METHOD, TRANSMITTING DEVICE AND METHOD, RECEIVING DEVICE AND METHOD, AND ROBOT APPARATUS

BACKGROUND OF THE INVENTION

1. Field of the Invention

The present invention relates to an image transmission device and method, a transmitting device and method, a receiving device and method, and robot apparatus, and is suitably applicable to, for example, an entertainment robot.

2. Description of the Related Art

There has been widely used various transmission systems such as International Telecommunication Union (ITU)-R REC656 as a transmission system of an image in image transmission systems such as a Television broadcasting system, a satellite broadcasting system, a Television-phone system, and a surveillance camera system.

In this case, these transmission systems, when image data of multiple channels are transmitted, requires to have multiple transmission lines or have some way for multiplexing each image data of the channels, since these transmission systems are formed on the premise that one image is transmitted via one transmission line.

Here, the first method to have multiple transmission lines as above is to assign separated transmission lines to each channel, and for example, this method is adopted in a surveillance system where multiple surveillance cameras and centers are wired and connected one-on-one. Furthermore, in this first method, format modification of the image data flowing through each of the transmission lines is not required, and therefore this first method has a benefit that existing systems can be used without system modification.

However, by this first method, it is necessary to wire and connect a transmitting side and the corresponding receiving side for each of the channels, and to prepare a new line for a new channel so as to increase the number of the channels, which makes the system construction and modification difficult.

On the other hand, the second method to transmit multiplexed image data of each channel through a single transmission line is widely used in dedicated purpose systems such as the Television broadcasting system, the satellite broadcasting system, and the Television-phone system. There have been known two multiplexing systems, a frequency division multiplexing system and a time division multiplexing system.

In the frequency division multiplexing system of those two systems, frequency bands used for transmission are setup for each channel respectively, and the signal of multiple channels having those different frequency bands are superposed and transmitted, where the receiving side can receive any channel by selecting the frequency band. This system is adopted in the Television broadcasting system and so forth.

In the time division multiplexing system, the image data of multiple channels are quantized at a data level within a frame, are divided, and are delivered, where at the receiving side, the image data of each channel are restored by way of reallocating the image data for each channel in order of arrival. This time division multiplexing system is adopted in the satellite broadcasting system and so forth.

However, since these multiplexing systems require the format modification of the image data on the transmission line, the existing system, which is formed on the premise of transmitting and receiving the image data through a single transmission line, cannot even restore the image with these multiplexing systems. Therefore, when a user of such existing systems newly adopts the above-mentioned multiplexing systems, it is required to modify the whole system including receiving devices, cables, and so on.

Specifically in the time division multiplexing system, it is necessary to have the transfer speed of the image data on the transmission line high according to the number of the channels to be multiplexed. The reason is that since, in the image data transmission, the reception of the last image data within one image at the receiving side means the completion of the transmission of one frame of the image, slow transfer speed of the transmission line for the number of the channels to be multiplexed causes a large time-lag until the reception of the image data, which causes a serious problem.

As described above, the proposed multiplexing systems cannot be realized by using the existing image transmission systems which is formed on the premise of transmitting and receiving of the image data through single transmission line, and have the difficulty to be realized by the modification of the existing image transmission systems.

SUMMARY OF THE INVENTION

In view of the foregoing, an object of this invention is to provide an image transmission device and method, a transmitting device and method, a receiving device and method, and robot apparatus capable of effectively transmitting the image data of multiple channels by using an existing system which is formed on the premise of transmitting and receiving of the image data through single transmission line.

The foregoing object and other objects of the invention have been achieved by the provision of an image transmission device in which transmitting means is provided with multiplexing means for multiplexing the image data of multiple channels to be input with switching the channels by frame and image information adding means for adding the prescribed image information to the image data of each frame multiplexed by the multiplexing means, and receiving means is provided with analyzing means for analyzing the image information added to the image data of each frame transmitted from the transmitting means and dividing means for dividing for each frame and outputting the multiplexed image data transmitted from the transmitting means to the corresponding channels based on the analysis result of the analyzing means.

As a result, the image data of multiple channels can be transmitted via single transmission line without format modification, so that an image transmission device capable of efficiently transmitting the image data by using the existing system formed on the premise of transmitting and receiving the image data through a single transmission line can be realized.

Also, in an image transmission method of the present invention, the first step for the transmitting side's transmitting the image data is provided with a multiplexing step for multiplexing the image data of multiple channels to be input with switching the channels by frame and an image information adding step for adding the prescribed image information to the image data of each frame multiplexed by the multiplexing step, and a second step of the receiving side's receiving the image data is provided with an analyzing step for analyzing the image information added to the image data of each frame transmitted from the transmitting side and a dividing step for dividing for each frame and outputting the multiplexed image data transmitted from the transmitting side to the corresponding channels based on the analysis result of the analyzing step.

As a result, the image data of multiple channels can be transmitted via single transmission line without format modification, so that an image transmission method capable of efficiently transmitting the image data by using the existing system formed on the premise of transmitting and receiving the image data through a single transmission line can be realized.

Furthermore, in the present invention, a transmitting device is provided with multiplexing means for multiplexing the image data of the multiple channels to be input with switching the channels by frame and image information adding means for adding the prescribed image information to the image data of each frame multiplexed by the multiplexing means.

As a result, the image data of multiple channels can be transmitted via single transmission line without format modification, so that a transmitting device capable of efficiently transmitting the image data by using the existing system formed on the premise of transmitting and receiving the image data through a single transmission line can be realized.

Furthermore, in this invention, a transmitting method is provided with a multiplexing step for multiplexing the image data of the multiple channels to be input with switching the channels by frame and an image information adding step for adding the prescribed image information to the image data of each frame multiplexed by the multiplexing step.

As a result, the image data of multiple channels can be transmitted via single transmission line without format modification, so that a transmitting method capable of efficiently transmitting the image data by using the existing system formed on the premise of transmitting and receiving the image data through a single transmission line can be realized.

Furthermore, in this invention, a receiving device is provided with analyzing means for analyzing the prescribed image information added to each frame of the image data multiplexed with switching the channels by frame transmitted from the transmitting side and dividing means for dividing for each frame and outputting the multiplexed image data transmitted from the transmitting side to the corresponding channels based on the analysis result of the analyzing means.

As a result, the image data of multiple channels transmitted from the transmitting side via single transmission line can be restored to be allocated to the original channels without format modification, so that a receiving device capable of efficiently transmitting the image data by using the existing system formed on the premise of transmitting and receiving the image data through a single transmission line can be realized.

In addition, in this invention, a receiving method is provided with an analyzing step for analyzing the prescribed image information added to the image data of each frame multiplexed with switching the channels by frame transmitted from the transmitting side and a dividing step for dividing for each frame and outputting the multiplexed image data transmitted from the transmitting side to the corresponding channels based on the analysis result of the analyzing step.

As a result, the image data of multiple channels transmitted from the transmitting side via single transmission line can be restored to be allocated to the original channels without format modification, so that a receiving method capable of efficiently transmitting the image data by using the existing system formed on the premise of transmitting and receiving the image data through a single transmission line can be realized.

Furthermore, in this invention, in robot apparatus comprised of an image transmission device transmitting the image data of multiple channels, transmitting means of the image transmission device is provided with multiplexing means for multiplexing the image data of multiple channels to be input with switching the channels by frame and image information adding means for adding the prescribed image information to the image data of each frame multiplexed by the multiplexing means, and receiving means of the image transmission device is provided with analyzing means for analyzing the image information added to the image data of each frame transmitted from the transmitting means and dividing means for dividing for each frame and outputting the multiplexed image data transmitted from the transmitting means to the corresponding channels based on the analysis result of the analyzing means.

As a result, the image data of multiple channels can be transmitted via single transmission line without format modification, so that robot apparatus capable of efficiently transmitting the image data by using the existing system formed on the premise of transmitting and receiving the image data through a single transmission line can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a conceptual diagram explaining an embedding processing of tag information corresponding to image data;

FIG. 10 is a conceptual diagram explaining output selection control information;

FIG. 12 is a diagram explaining a decision method of an output channel based on output frequency;

DETAILED DESCRIPTION OF THE EMBODIMENT

Preferred embodiments of this invention will be described with reference to the accompanying drawings:

(1) Construction of a Robot in This Embodiment

Figure 1:
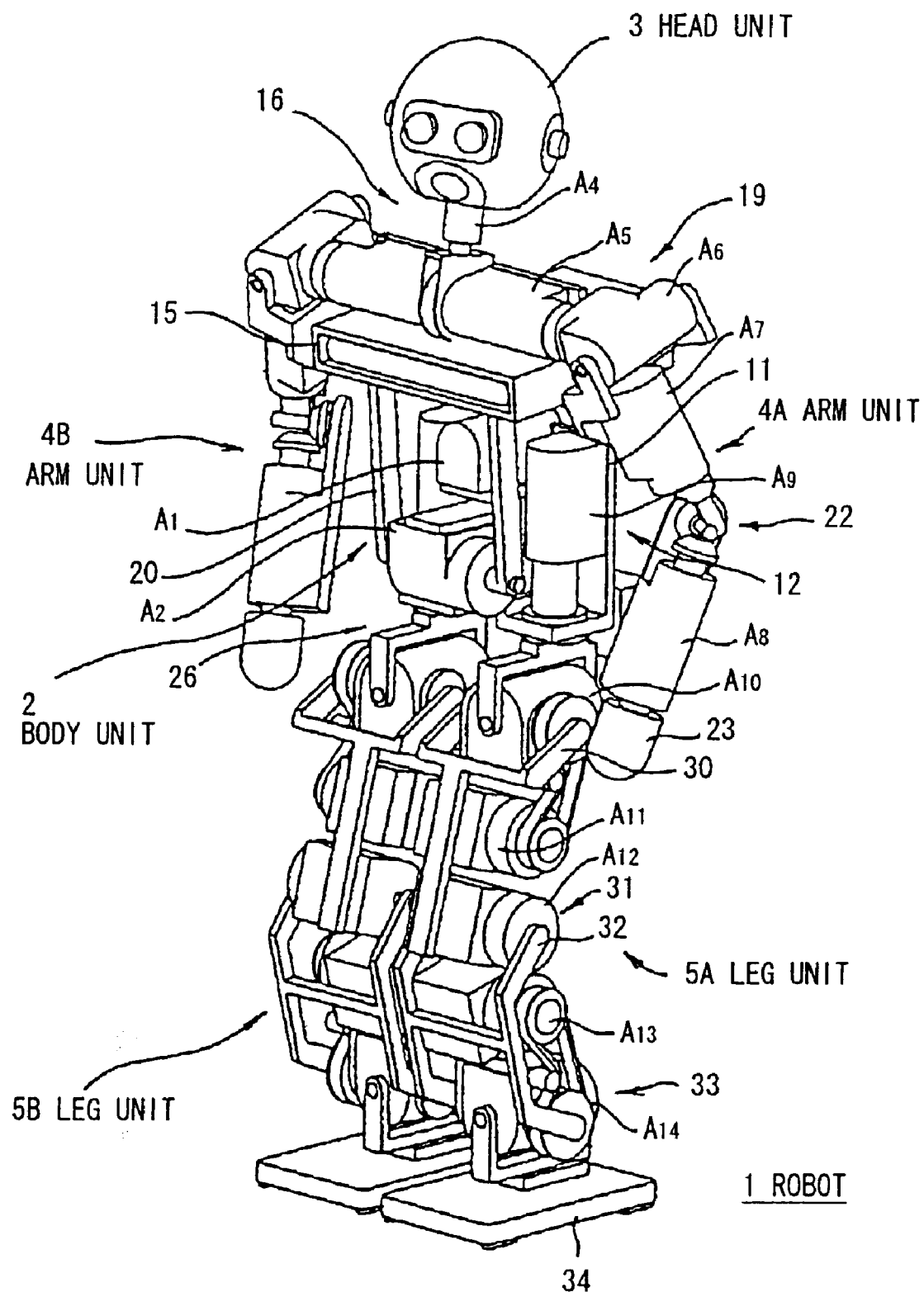
FIG. 1 is a dissected perspective view showing an external construction of a robot in this embodiment.
Figure 2:
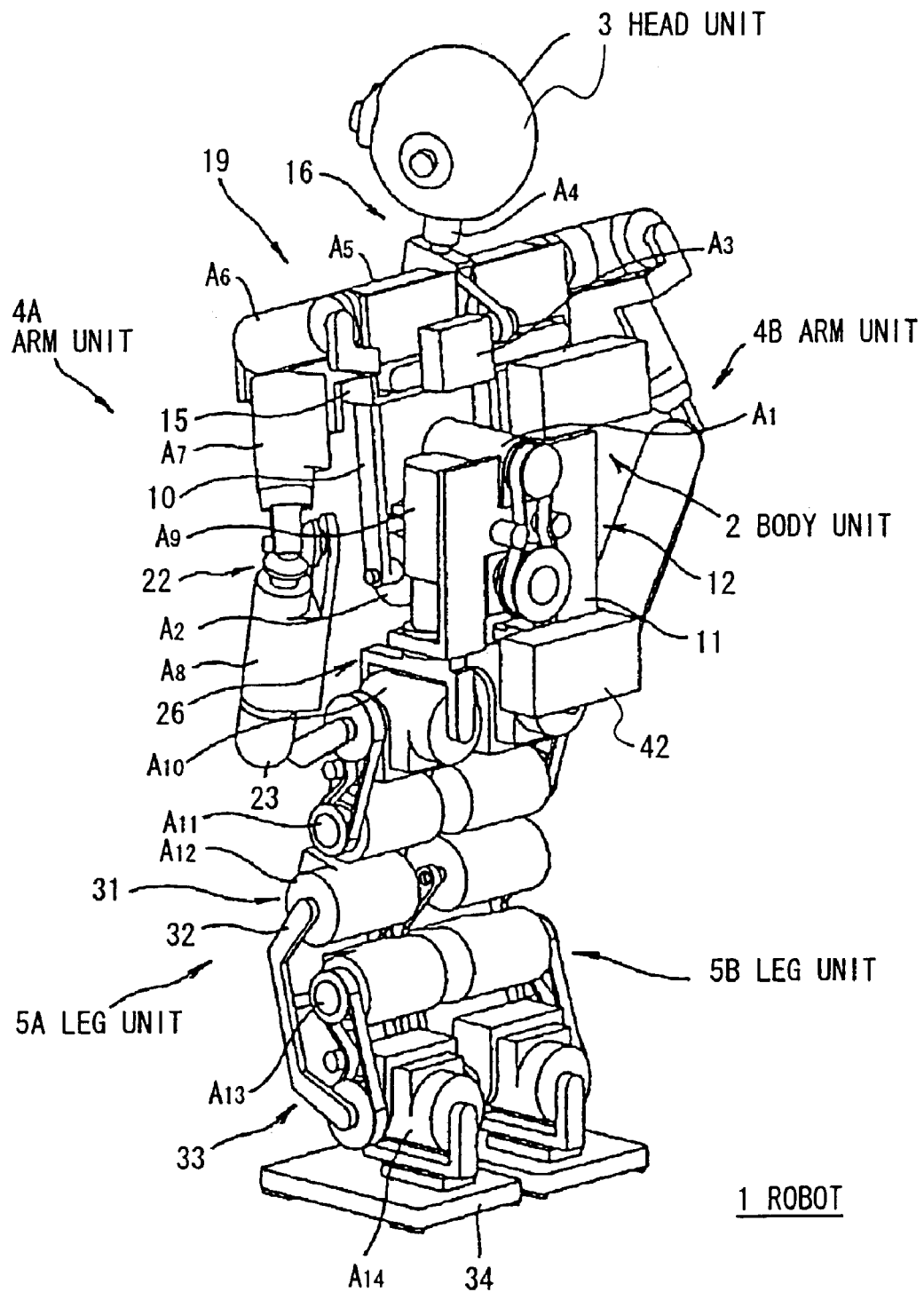
FIG. 2 is a dissected perspective view showing an external construction of a robot.

In FIGS. 1 and 2, reference number 1 shows, as a whole, a bipedal walking type robot in this embodiment. The robot comprises a head unit 3 which is disposed on the upper part of a body unit 2, arm units 4A and 4B of the same construction which are disposed on the left and right of the upper part of the body unit 2 respectively, and leg units 5A and 5B of the same construction which are attached to prescribed positions on the lower part of the body unit 2.

Figure 3:
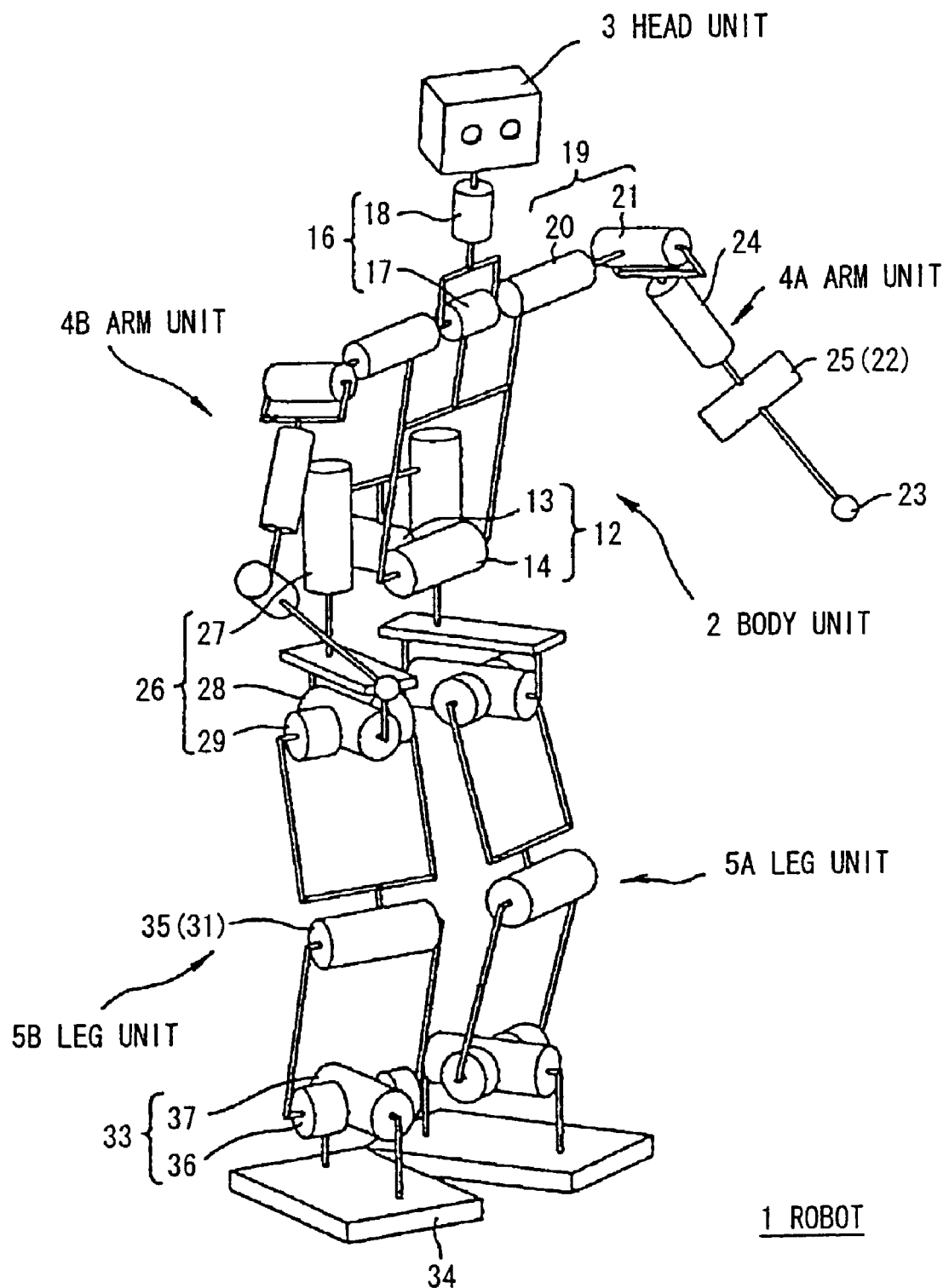
FIG. 3 is a schematic diagram explaining an external construction of a robot.

In the body unit 2, a frame 10 forming the upper part of the main body and a waste base 11 forming the lower part of the main body are jointed via a waste joint system 12, where the upper part of the main body can be independently rotated around a roll axis 13 and a pitch axis 14 orthogonal each other shown in FIG. 3 by driving each of the corresponding actuators $A_1$ and $A_2$ of the waste joint system 12 fixed to the waste base 11 of the lower part of the main body.

Further, the head unit 3 is attached to the middle part of the upper surface of a shoulder base 15 fixed to the upper edge of the frame 10 via a neck joint system 16, where the head unit 3 can be independently rotated around a pitch axis 17 and a yawing axis 18 orthogonal each other shown in FIG. 3 by driving each of the corresponding actuators $A_3$ and $A_4$ of the neck joint system 16.

Furthermore, the arm units 4A and 4B are attached to the right and left of the shoulder base 15 via a shoulder joint system 19 respectively, where the arm units 4A and 4B can be independently rotated around a pitch axis 20 and a roll axis 21 orthogonal each other shown in FIG. 3 by driving each of the corresponding actuators $A_5$ and $A_6$ of the shoulder joint system 19.

In this case, each of the arm units 4A and 4B is comprised of an actuator $A_8$ forming a fore arm part joined, via an elbow joint system 22, to an output axis of an actuator $A_7$ forming an upper arm part, and a hand part 23 attached to the edge of the fore arm part.

In each of the arm units 4A and 4B, the upper arm part can be rotated around a yawing axis 24 shown in FIG. 3 by driving the actuator $A_7$, and the fore arm part can be rotated around a pitch axis 25 shown in FIG. 3 by driving the actuator $A_8$.

Each of the leg units 5A and 5B is attached to the waste base 11 of the lower part of the main body via a thigh joint system 26 respectively, where each of the leg units 5A and 5B can be independently rotated around a yawing axis 27, a roll axis 28, and a pitch axis 29 orthogonal each other shown in FIG. 3 by driving each of the corresponding actuators $A_9$–$A_{11}$ of the thigh joint system 26.

In this case, each of the leg units 5A and 5B is comprised of a frame 32 forming a lower thigh part joined, via a knee joint system 31, to the lower edge of a frame 30 forming a thigh part, and a foot part 34 joined to the lower edge of the frame 32 via an ankle joint system 33.

Accordingly, in each of the leg units 5A and 5B, the lower thigh part can be rotated around a pitch axis 35 shown in FIG. 3 by driving an actuator $A_{12}$ forming the knee joint system 31, and the foot part 34 can be independently rotated around a pitch axis 36 and a roll axis 37 orthogonal each other shown in FIG. 3 by driving actuators $A_{13}$ and $A_{14}$ of the ankle joint system 33.

Figure 4:
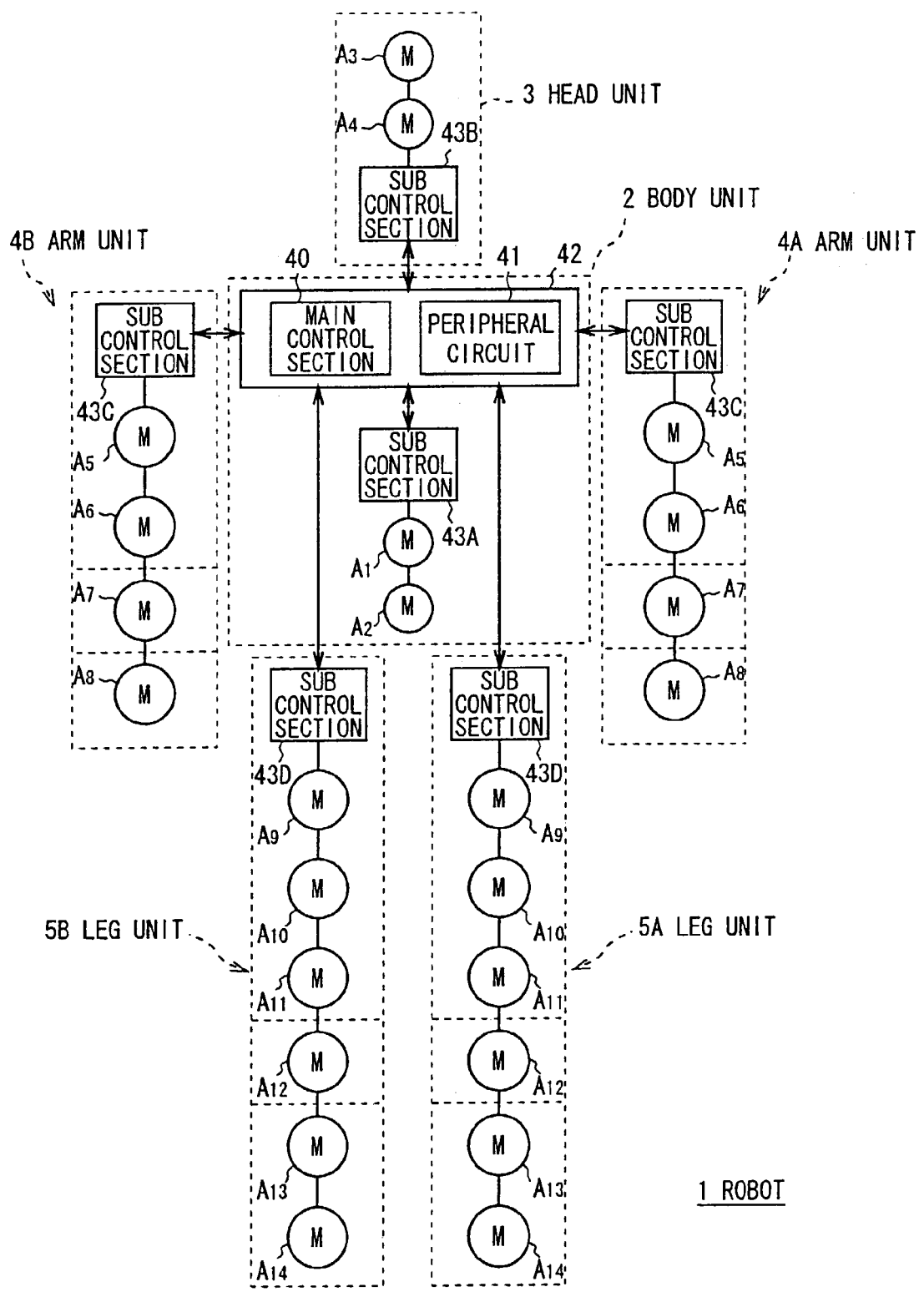
FIG. 4 is a block diagram explaining an internal construction of a robot.

On the other hand, on the back side of the waste base 11 forming the lower part of the main body of the body unit 2, as shown in FIG. 4, a control unit 42 is disposed, in which a main control section 40 for controlling the whole operation of the robot 1, a peripheral circuit 41 such as a power supply circuit and a communication circuit, and a battery 45 (FIG. 5) are stored in a box.

This control unit 42 is connected to each of sub control sections 43A–43D disposed inside each of the construction units (the body unit 2, the head unit 3, each of the arm units 4A and 4B, and each of the leg units 5A and 5B) respectively so that this control unit 42 can provide necessary power supply voltage to these sub control sections 43A–43D and can communicate with these sub control sections 43A–43D.

Furthermore, each of the sub control sections 43A–43D is connected to the actuators $A_1$–$A_{14}$ inside the corresponding construction units respectively so that the actuators $A_1$–$A_{14}$ inside the construction units can be driven to the designated condition based on the various types of control commands given from the main control section 40.

Figure 5:
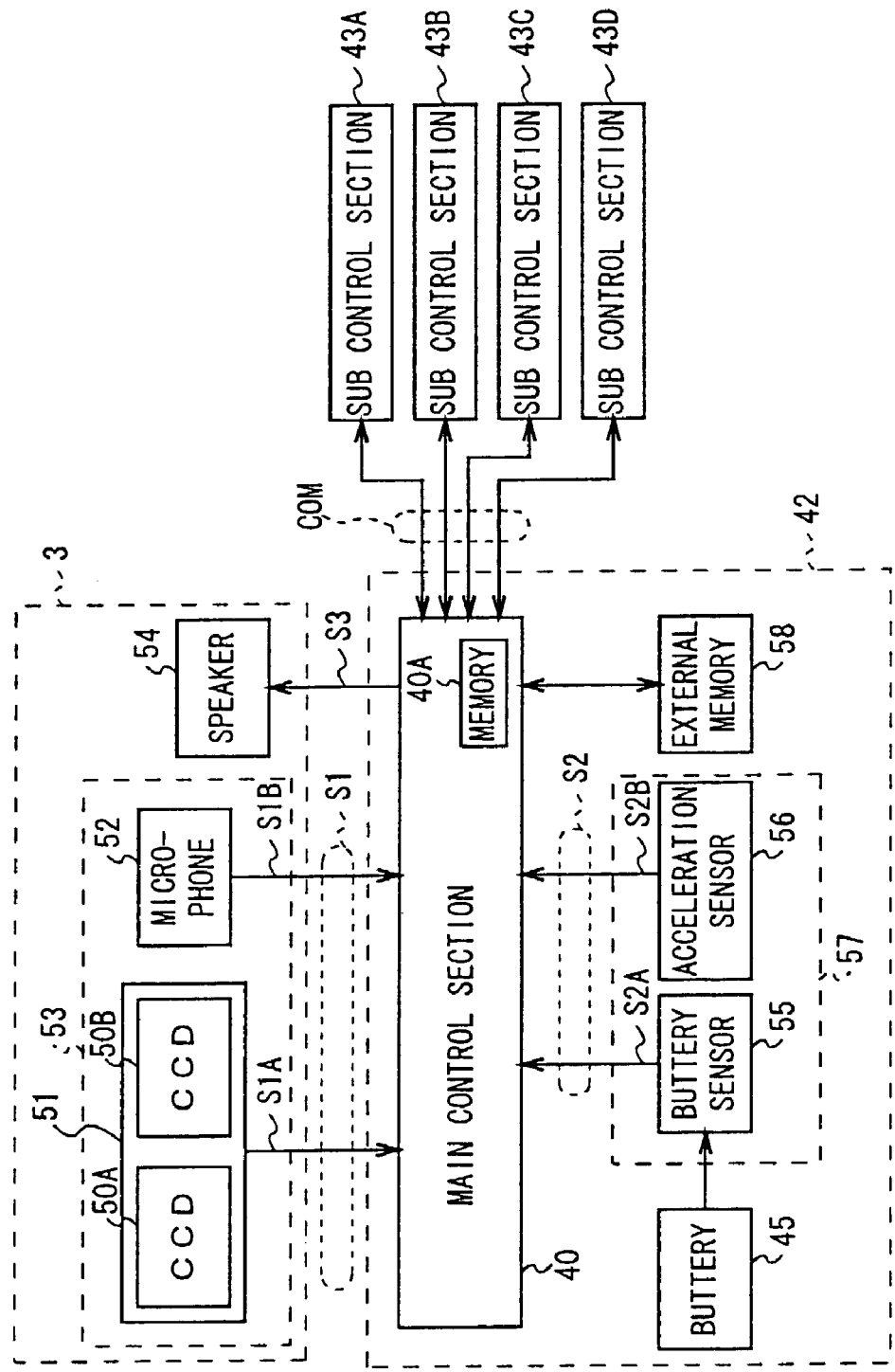
FIG. 5 is a block diagram explaining an internal construction of a robot.

Still further, in the head unit 3, as shown in FIG. 5, an external sensor section 53 comprised of a pair of Charge Coupled Device (CCD) cameras 50A and 50B functioning as "eyes" of the robot 1 for left eye and right eye respectively, a microphone 52 functioning as "ears", and a speaker 54 functioning as "a mouth" is disposed at a prescribed position, and inside the control unit 42, an internal sensor section 57 comprised of a battery sensor 55, an acceleration sensor 56, and so forth is disposed.

The outputs of each of the CCD cameras 50A and 50B of the external sensor section 53 are multiplexed at an image transmitting unit 51, and are provided to the main control section 40 as image transmission signals S1A, while the microphone 52 collects various command sounds such as "walk", "lie down" or "chase after the ball" to be given from the user as sound inputs, and delivers the resultant sound signals S1B to the main control section 40.

Furthermore, the battery sensor 55 of the internal sensor section 57 detects a remaining amount of the battery 45 at a prescribed period, and delivers the detected result to the main control section 40 as a battery remaining amount detecting signal S2A, while the acceleration sensor 56 detects the acceleration of the three-axis direction (x-axis, y-axis and z-axis) at a prescribed period, and delivers the detected result to the main control section 40 as an acceleration detecting signal S2B.

The main control section 40 judges the surrounding and the internal conditions of the robot 1, and the existence or non-existence of the commands and the approaches from the user based on external sensor signals S1 such as the image transmission signal S1A and the sound signal S1B provided from the image transmitting unit 51 and the microphone 52 of the external sensor section 53 respectively, and internal sensor signals S2 such as the battery remaining amount detecting signal S2A and the acceleration detecting signal S2B provided from the battery sensor 55 and the acceleration sensor 56 of the internal sensor section 57.

And the main control section 40 decides the following performance based on the judged result, a control program pre-stored in an internal memory 40A, and the loaded various types of control parameters, then delivers the control command based on the decision result to the corresponding sub control sections 43A–43D. As a result, based on the control command, under the control of the sub control sections 43A–43D, the corresponding actuators $A_1$–$A_{14}$ are driven, and therefore the performance such as having the head unit 3 swing up and down, right and left, having the arm units 4A and 4B put up, and walking, can be realized by the robot 1.

Furthermore, the main control section 40 provides a prescribed sound signal S3 to the speaker 54 as required, so that the sound based on the sound signal S3 is output.

In this manner, the robot 1 can perform autonomously based on the surrounding and the internal conditions, and the existence or non-existence of the commands and the approaches from the user.

(2) Construction of an Image Transmission System 60 in the Robot 1

(2-1) Whole Construction of an Image Transmission System 60 in the Robot 1

Next explanation will be made about a transmission system of the image data (hereinafter referred to as an image transmission system) in the robot 1.

Figure 6:
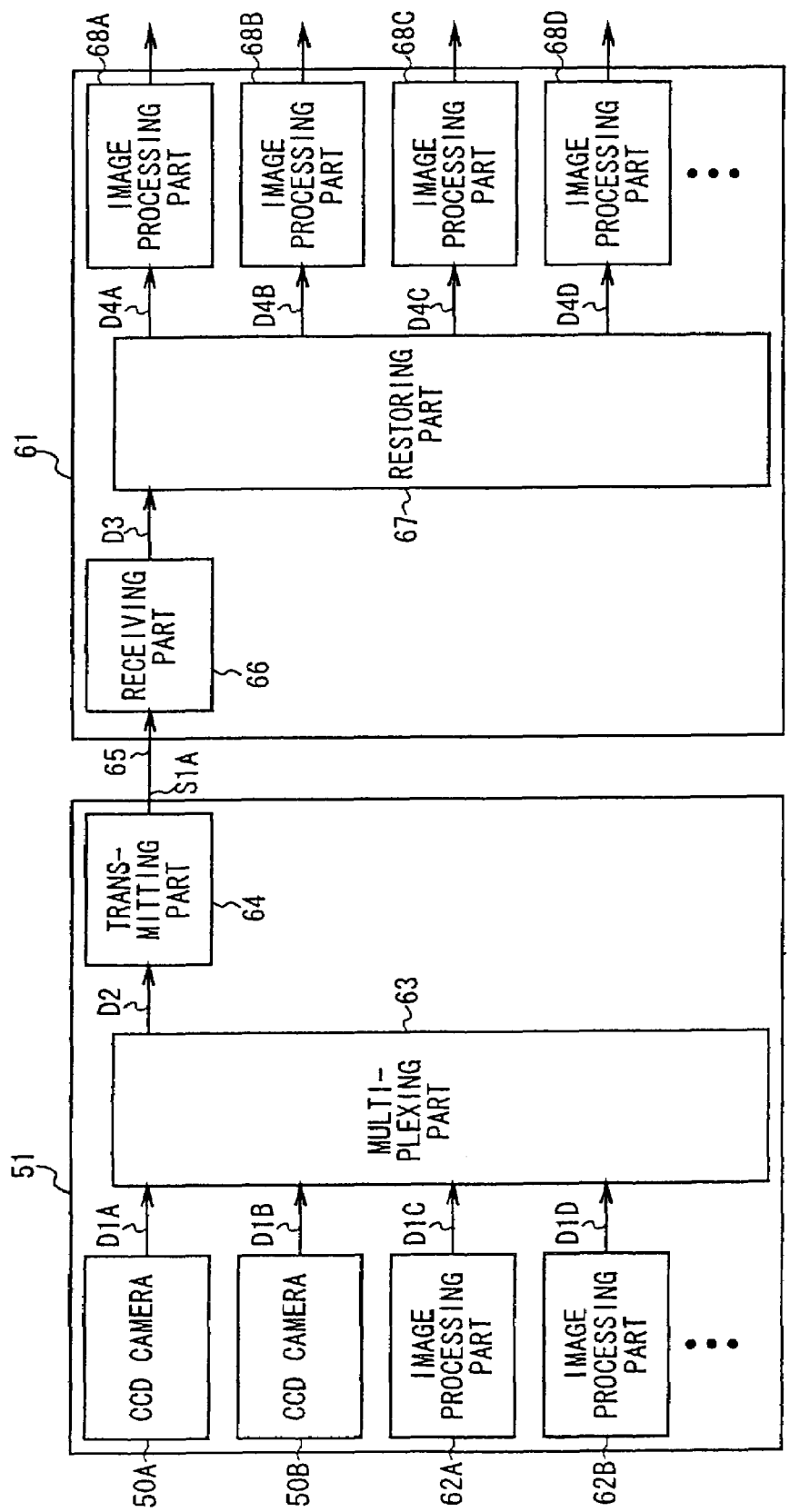
FIG. 6 is a block diagram showing a whole construction of an image transmission system in this embodiment.

FIG. 6 is showing an image transmission system 60 adopted in the robot 1 which is comprised of the above-mentioned image transmitting unit 51 disposed inside the head unit 3 and an image receiving unit 61 disposed inside the main control section 40.

In the image transmitting unit 51, image data D1A and D1B output from each of the CCD cameras 50A and 50B for the left eye and the right eye respectively and image Data D1C and D1D of a specific image for various types of signal processing such as color detecting processing, motion detecting processing, or edge detecting processing generated at a plurality of image processing parts 62A and 62B based on the image data D1A and D1B are multiplexed by a frame with skipping unnecessary image at a multiplexing part 63.

At the same time, the multiplexing part 63 adds tag information to be used when dividing the image data D1A–D1D according to the original channels at the image receiving unit 61 to the image data D1A–D1D equivalent to the multiplexed each one frame, and delivers so obtained tag information adding multiplexing data D2 to a transmitting part 64.

Then, the transmitting part 64 converts the provided tag information adding multiplexing data D2 to the image transmission signal S1A of a prescribed format, for example, ITU-R REC656, and delivers the signal to the image receiving unit 61 via wiring 65 which is a single transmission line.

On the other hand, in the image receiving unit 61, the format of the provided image transmission signal S1A is converted to a tag information adding multiplexing data D3 of the original format at a receiving part 66, and is delivered to a restoring part 67.

Furthermore, in the restoring part 67, tag information is extracted from the tag information adding multiplexing data D3, and based on the tag information, one frame of the image data D4A–D4D included in the tag information adding multiplexing data D3 is allocated to the corresponding channel. Then the image data D4A–D4D allocated to each channel are separately delivered to corresponding image processing parts 68A–68D in the main control section 40.

Then, the image processing parts 68A–68D, based on the provided image data D4A–D4D, execute processing such as color detecting processing, motion detecting processing, or edge detecting processing disclosed in H11-129274. The various types of detected processing results are provided to an upper controller of a subsequent stage, and based on these various types of the detected processing results, various types of control processing for above-mentioned autonomous performance are conducted.

(2-2) Detailed Construction of the Multiplexing Part 63 at the Image Transmitting Unit 51

(2-2-1) Detailed Construction of the Multiplexing Part 63

Figure 7:
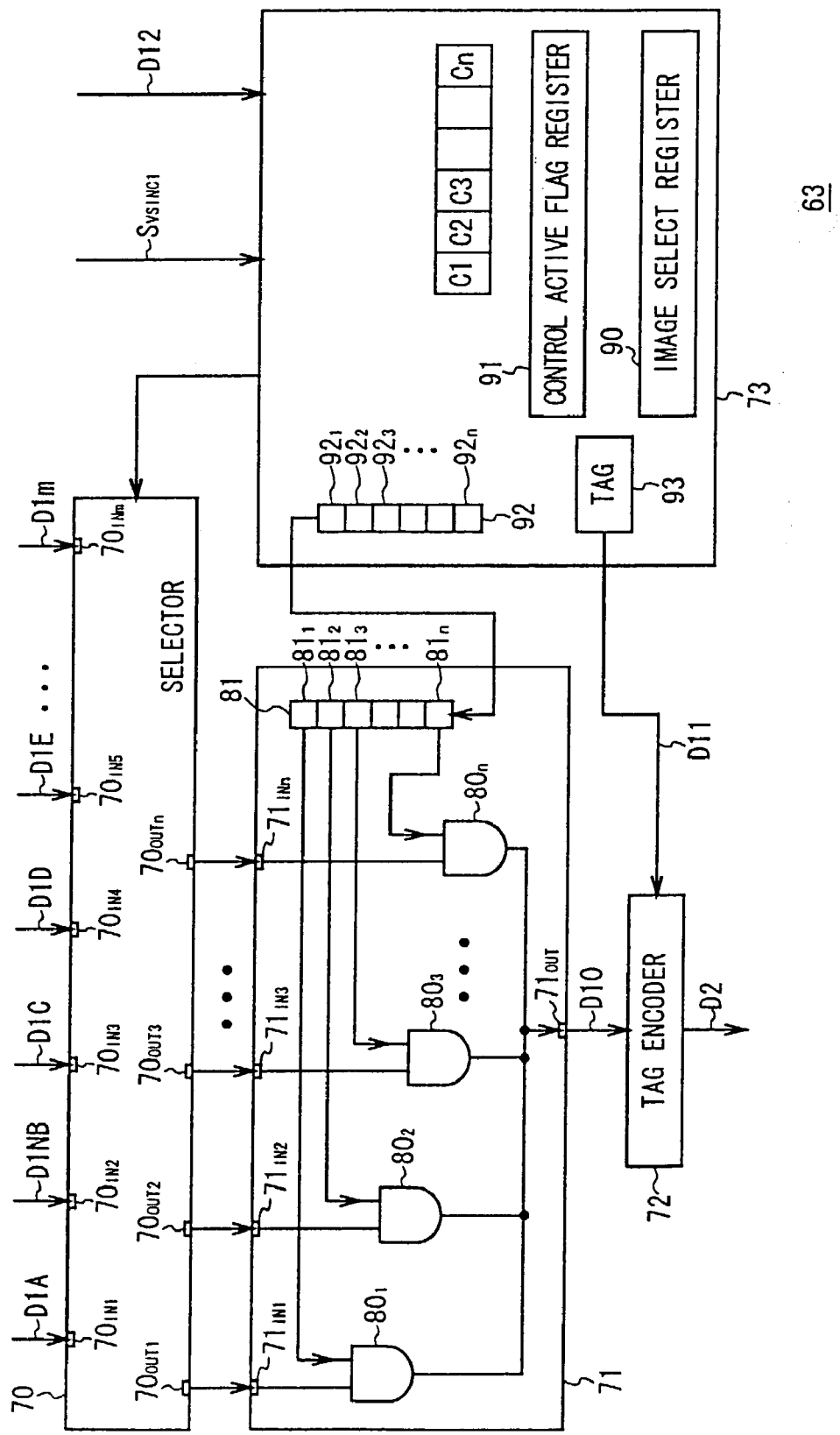
FIG. 7 is a block diagram showing a detailed construction of a multiplexing part of an image transmitting unit.

Herein, FIG. 7 is showing the detailed construction of the multiplexing part 63 at the above-mentioned image transmitting unit 51. As is obvious from this FIG. 7, the multiplexing part 63 is comprised of a selector 70, a multiplexer 71, a tag encoder 72, and a controller 73.

The selector 70 has a plurality of input ports $70_{IN1}$–$70_{INm}$ and a plurality of output ports $70_{OUT1}$–$70_{OUTn}$, and under the control of the controller 73, connects the designated input ports $70_{IN1}$–$70_{INm}$ and the output ports $70_{OUT1}$–$70_{OUTn}$.

Then, the selector 70 inputs the image data D1A–D1m for each channel provided from the CCD cameras 50A and 50B and image processing parts 62A and 62B via the input ports $70_{IN1}$–$70_{INm}$ respectively, and using one frame of frame memory disposed inside (not shown in Figs.), delivers these image data D1A–D1m to the multiplexer 71 via the corresponding output ports $70_{OUT1}$–$70_{OUTn}$ with synchronizing with a vertical synchronizing signal $S_{VSINK1}$ as a standard signal in the image transmitting unit 51 provided from one of the CCD cameras 50A and 50B.

The multiplexer 71 has a plurality of input ports $71_{IN1}$–$71_{INn}$ arranged corresponding to each of the output ports $70_{OUT1}$–$70_{OUTn}$ of the selector 70, a plurality of AND circuits $80_1$–$80_n$ arranged corresponding to these input ports $71_{IN1}$–$71_{INn}$, and a memory 81 comprising a plurality of one bit memory domain $81_1$–$81_n$ corresponding to these AND circuits $80_1$–$80_n$ (hereinafter referred to as a switch memory). Each of these input ports $71_{IN1}$–$71_{INn}$ is connected to the corresponding first signal input terminal of the AND circuits $80_1$–$80_n$ while each of the second signal input terminal is connected to the corresponding one bit memory domain $81_1$–$81_n$ of the switch memory 81.

In this case, a flag is stored in one of the one bit memory domain $81_1$–$81_n$ of the switch memory 81 of the multiplexer 71 by the controller 73. This flag is updated at every arrival of a falling period, in which the image data of the vertical synchronizing signal $S_{VSINK1}$ is not transmitted within the falling period, and is stored in only one of the memory domain $81_1$–$81_n$ corresponding to the channel decided to be output within the next arising period of the vertical synchronizing signal $S_{VSINK1}$ by the controller 73.

Accordingly, in the multiplexer 71, during the rising period of the vertical synchronizing signal $S_{VSINK1}$, only the AND circuits $80_1$–$80_n$ corresponding to the one bit memory domain $81_1$–$81_n$, in which the flag in the switch memory 81 is stored, validly operate, therefore, only one frame of the image data D1A–D1m input via the input ports $71_{IN1}$–$71_{INn}$ connected to the AND circuits $80_1$–$80_n$ is delivered, via the AND circuits $80_1$–$80_n$ and the output port $71_{OUT}$ sequentially, to the tag encoder 72 as multiplexing data D10.

At this time, the tag encoder 72 is, as the above-mentioned tag information D11, provided in advance with the port number of the output ports $70_{OUT1}$–$70_{OUTn}$ of the selector 70 to which one frame of the image data D1A–D1m is output (hereinafter referred to as an output port number), the port number of the input ports $7_{IN1}$–$70_{INm}$ of the selector 70 connected to the output ports $70_{OUT1}$–$70_{OUTn}$ at this time (hereinafter referred to as an input port number), and the frame number of the frame.

Figure 8:
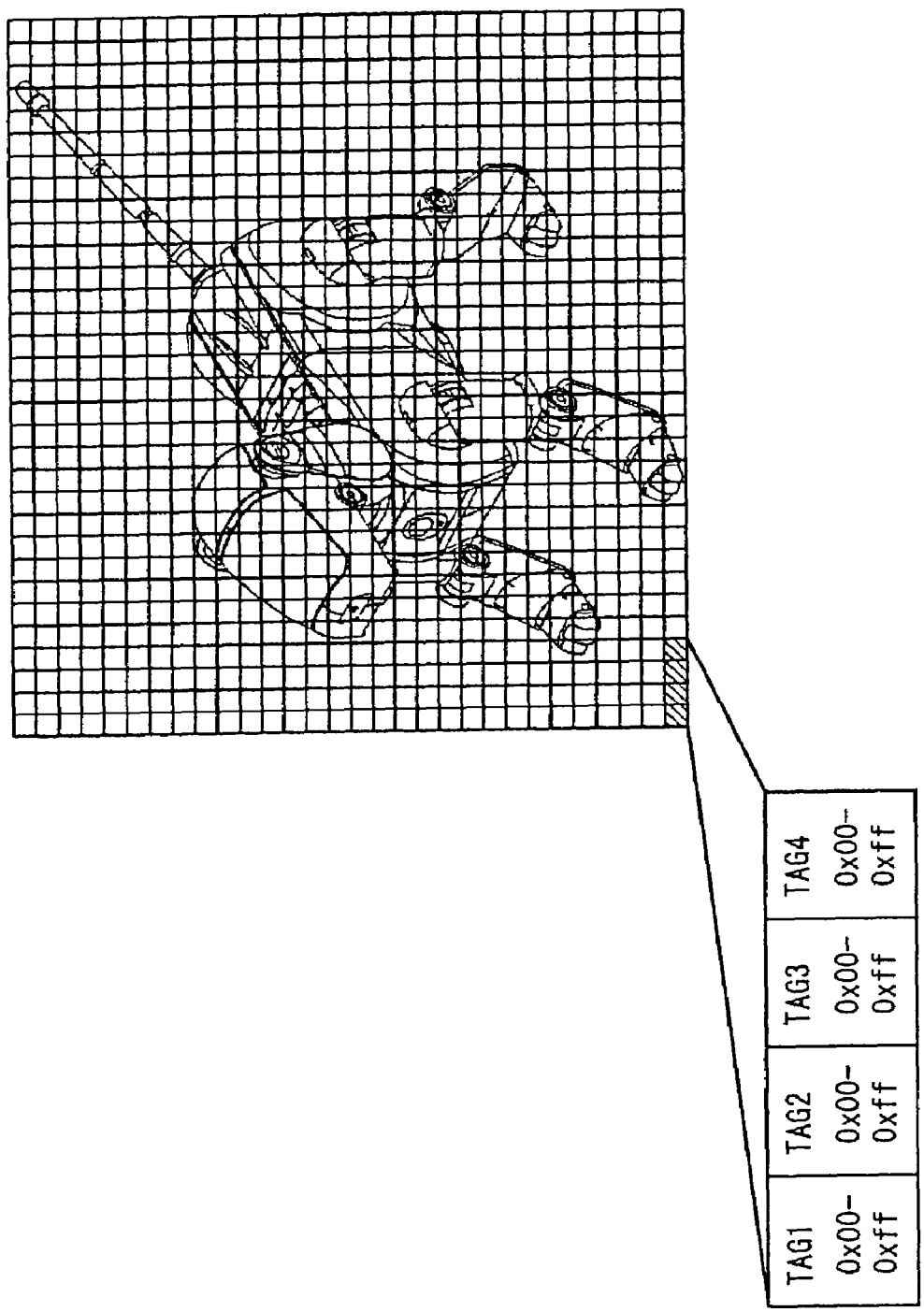
FIG. 8 is a conceptual diagram explaining an embedding processing of tag information corresponding to image data.

Accordingly, the tag encoder 72 embeds the tag information D11 by replacing the pixel data of four continuing pixels at the bottom of the left edge in the image as shown in FIGS. 8 and 9 with each data of the output port number, input port number, frame number, and reserved data provided as above-mentioned tag information D11 starting from the left and consequently, and delivers so obtained above-mentioned tag information adding multiplexing data D2 (FIG. 6) to the transmitting part 64 (FIG. 64).

On the other hand, the controller 73 comprises, as is obvious from FIG. 7, a plurality of counters C1–Cn arranged corresponding to each of the output ports $70_{OUT1}$–$70_{OUTn}$ of the selector 70, an image select register 90 for memory holding after-mentioned output selection control information D12, a control active flag register 91 for storing a flag indicating the update of the output selection control information D12 (hereinafter referred to as a control active flag), an output selection flag register 92 comprising one bit memory domain $92_1$–$92_n$ corresponding to each of the one bit memory domain $81_1$–$81_n$ of the switch memory 81 of the multiplexer 71, and a tag information storing register 93 for temporally storing the tag information D11.

In this case, the controller 73 is previously provided from the upper controller with the output selection control information D12 in which the port number of the input ports $70_{IN1}$–$70_{INm}$ of the selector 70 to which each of the output ports $70_{OUT1}$–$70_{OUTn}$ is expected to be connected, and the output frequency at which the image data of each channel connected to each of the output ports $70_{OUT1}$–$70_{OUTn}$ of the selector 70 is output (output frequency) are prescribed. Accordingly, the controller 73 keeps the output selection control information D12 as a table shown in FIG. 10 in the image select register 90.

Then, the controller 73, at the initial stage, based on the output selection control information D12 kept in the image select register 90, controls the selector 70, so that corresponding each of the output ports $70_{OUT1}$–$70_{OUTn}$ and the input ports $70_{IN1}$–$70_{INm}$ of the selector 70 can be connected.

Furthermore, after above, the controller 73 decides the channel to be output within the next rising period of the vertical synchronizing signal $S_{VSINK1}$ (in practice, the output ports $70_{OUT1}$–$70_{OUTn}$ of the selector 70 connected to this channel) at every arrival of the falling period of the above-mentioned vertical synchronizing signal $S_{VSINK1}$ provided from the CCD cameras 50A and 50B (FIG. 6) so that the output frequency of each channel given as above-mentioned output selection control information D12 is matched.

Then, the controller 73 adds the above-mentioned tag information D11 to one frame of the image data D1A–D1m provided within the next rising period of the vertical synchronizing signal $S_{VSINK1}$ to the tag encoder 72 by providing the tag information D11 based on the decision result to the tag encoder 72 via the tag information storing register 93 within the present falling period of the vertical synchronizing signal $S_{VSINK1}$.

In addition, the controller 73 temporally keeps the flag based on the so decided result in the corresponding one bit memory domain $92_1$–$92_n$ in the output selection flag register 92 during the present falling period of the vertical synchronizing signal $S_{VSINK1}$, as well as outputs so decided one frame of the image data D1A–D1m of the channel during the rising period of the vertical synchronizing signal $S_{VSINK1}$ from the multiplexer 71 by storing the flag in the one bit memory domain $81_1$–$81_n$ corresponding to the switch memory 81 of the multiplexer 71 based on the flag immediately after the start-up of the next rising period of the vertical synchronizing signal $S_{VSINK1}$.

Furthermore, the controller 73 stores the control active flag in the control active flag register 91 as well as updates the output election control information D12 kept in the image select register 90 to a new output selection control information D12 when a command to update the output selection control information D12 and a new output selection control information D12 corresponding to this command are provided from the upper controller.

Then, the controller 73 is configured to connect the each of the designated input ports $70_{IN1}$–$70_{INm}$ and the output ports $70_{OUT1}$–$70_{OUTn}$ as well as to initialize each of the counters C1–Cn based on the new output selection control information D12 and to execute the same control processing based on the output selection control information D12 as described above by controlling the selector 70 based on the new output selection control information D12 stored in the image select register 90 corresponding to that the control active flag is stored in the control active flag register 91 within the falling period of the vertical synchronizing signal $S_{VSINK1}$ right after above.

(2-2-2) Channel Decision Method Based on the Output Frequency

Next explanation will be made about the output frequency provided, as described above, to the controller 73 from the upper controller as the output selection control information D12 and a channel decision method for deciding the channel to be output next based on the output frequency.

Figure 11:
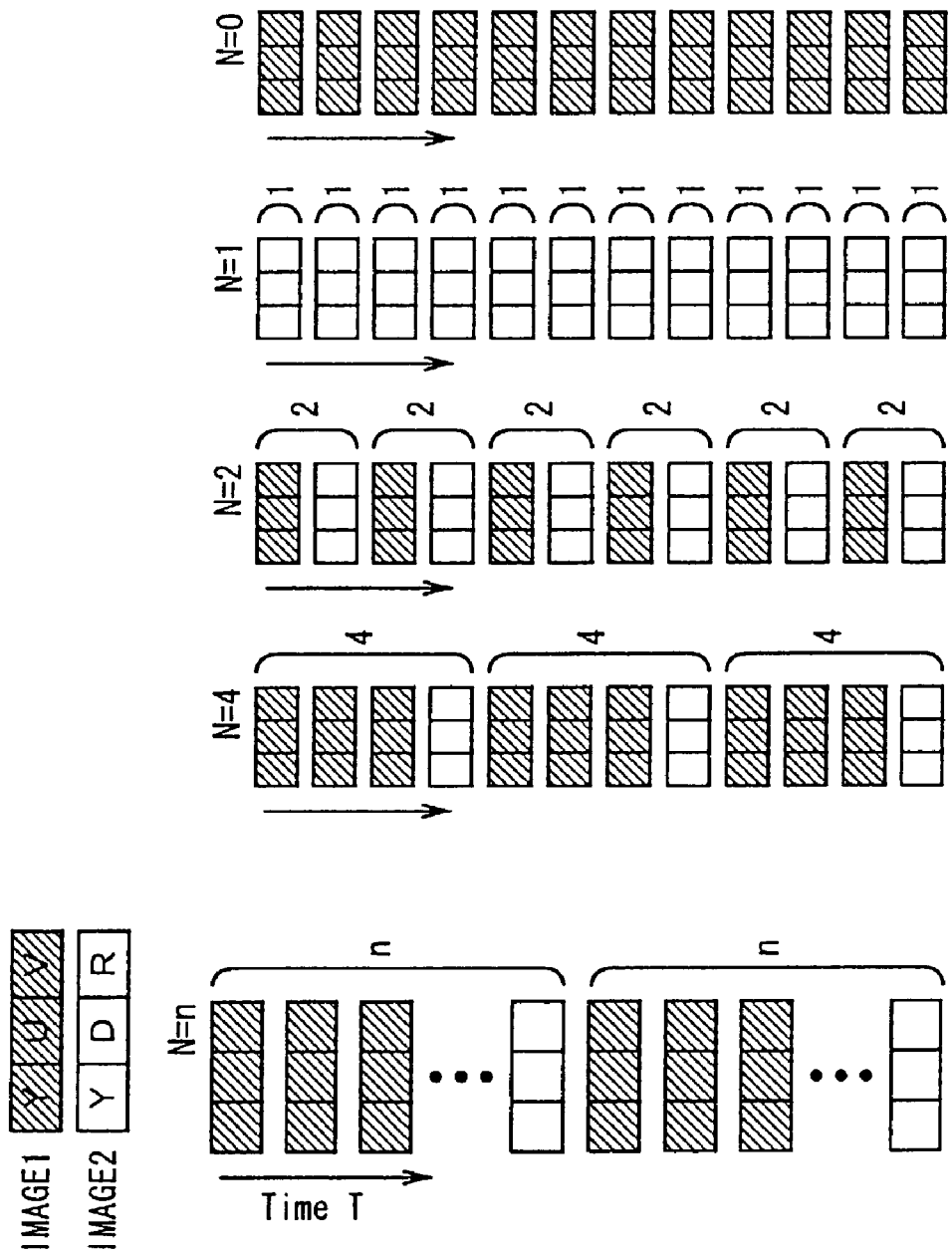
FIG. 11 is a conceptual diagram explaining output frequency.

The output frequency "N" means, for example as shown in FIG. 11, the output ratio at which one frame of the image of the channel connected to the output port to which output frequency "N" is assigned is output while N frames of image data of the channel connected to the prescribed output port which is the standard of the selector 70 (in this embodiment, output port $70_{OUT1}$ with port number "1") is input.

For example, the output frequency "1" of the channel connected to the output port with port number "2" means that one frame of the image data D1A–D1m of the channel connected to the output port $70_{OUT2}$ with port number "2" is required to be output while one frame of the image data D1A–D1m of the channel connected to the output port $70_{OUT1}$ with port number "1" is input. Therefore, as shown in FIG. 11, in case that there are only two output ports $70_{OUT1}$ and $70_{OUT2}$ with port numbers "1" and "2" respectively, under this output frequency, the image data D1A–D1m of the channel connected to the output port $70_{OUT2}$ with port number "2" are output at all times (the case of N=1 in FIG. 11).

Further, the output frequency "4" of the channel connected to the output port $70_{OUT2}$ with port number "2" means that one frame of the image data D1A–D1m of the channel connected to the output port $70_{OUT2}$ with port number "2" is required to be output while four frames of the image data D1A–D1m of the channel connected to the output port $70_{OUT1}$ with port number "1" are input. Therefore, in this example of FIG. 11, while four frames of the image data D1A–D1m of the channel connected to the output port $70_{OUT1}$ with port number 1 are input, one frame of the image data D1A–D1m of the channel connected to the output port $70_{OUT2}$ with port number "2" is output and the image data D1A–D1m of the channel connected to the output port $70_{OUT1}$ with port number "1" is output as for the rest three frames (the case of N=4 in FIG. 11).

When "0" is assigned as the output frequency, the image data D1A–D1m of the channel connected to the output ports $70_{OUT1}$–$70_{OUTn}$ to which this output frequency is assigned are not output. Therefore, for example in FIG. 11, only the image data D1A–D1m of the channel connected to the output port $70_{OUT1}$ with port number "1" are output (the case N=0 in FIG. 11).

The controller 73 controls the multiplexer 71 so that the image data D1A–D1m of each of the channels connected to each of the output ports $70_{OUT1}$–$70_{OUTn}$ respectively are output in one frame at a time with the designated output frequency respectively based on the output frequency for each of the output ports $70_{OUT1}$–$70_{OUTn}$ of the selector 70 kept in the image select register 90 as the output selection control information D12.

In specifically, the controller 73, at first, sets the value of the output frequency corresponding to each of the output ports $70_{OUT1}$–$70_{OUTn}$ of the selector 70 kept in the image select register 90 as the initial value of each of the counters C1–Cn corresponding to the output ports $70_{OUT1}$–$70_{OUTn}$ respectively. For example as shown in FIG. 12, when there are four output ports $70_{OUT1}$–$70_{OUT4}$ in the selector 70 and the output frequencies are "3", "2", and "5" corresponding to the output ports $70_{OUT2}$–$70_{OUT4}$ with port numbers "2", "3", and "4" respectively, these values are set as the initial values of the counters C2–C4 corresponding to the output ports $70_{OUT2}$–$70_{OUT4}$ respectively.

Then the controller 73 monitors the vertical synchronizing signal $S_{VSINK1}$, and reads the count values of the counters C2–C4 at every arrival of the falling period of the vertical synchronizing signal $S_{VSINK1}$. When the count value "1" cannot be found in the counters C2–Cn corresponding to the output ports $70_{OUT2}$–$70_{OUTn}$ with port number after "2" of the selector 70, the controller 73 decides the channel connected to the output port $70_{OUT1}$ with port number "1" as the channel to which the image data D1A–D1m is output next, as well as makes one by one decrements of the count values of each of the counters C2–Cn corresponding to the output ports $70_{OUT2}$–$70_{OUTn}$ with port number after "2".

For example in FIG. 12, in the initial condition, as the count values of each of the counters C2–C4 corresponding to the output ports $70_{OUT2}$–$70_{OUT4}$ with port number "2", "3", and "4" of the selector 70 are "3", "2", and "5" respectively, the channel connected to the output port $70_{OUT1}$ with port number "1" is decided as the channel to which the image data D1A–D1m is output next, and the count values of the counters C2–C4 corresponding to the output ports $70_{OUT2}$–$70_{OUT4}$ with port numbers "2", "3", and "4" are made one by one decrements to be updated to "2", "1", and "4" respectively.

On the other hand, when count value "1" is found in the counters C2–Cn corresponding to the output ports $70_{OUT2}$–$70_{OUTn}$ with port number after "2" of the selector 70, the controller 73 decides the channel connected to the output ports $70_{OUT2}$–$70_{OUTn}$ of the selector 70 corresponding to the counters C2–Cn as the channel to which the image data D1A–D1m is output next as well as resets the count values of the counters C2–Cn to the initial values.

For example in FIG. 12, in the channel deciding processing of the second frame, as the count values of the counters C2–C4 corresponding to the output ports $70_{OUT2}$–$70_{OUT4}$ with port numbers "2", "3", and "4" of the selector 70 are "2", "1", and "4", the channel connected to the output port $70_{OUT3}$ with port number "3" of the selector 70 is decided as the channel to which the image data D1A–D1m is output next, and the count value of the counter C3 corresponding to this channel is set to the initial value "2".

Here, when the controller 73 reads each count value of the counters C2–Cn after the arrival of the falling period of the vertical synchronizing signal $S_{VSINK1}$, the controller 73 reads the counters C2–Cn corresponding to the output ports $70_{OUT2}$–$70_{OUTn}$ with smaller port number of the selector 70 sequentially from the smallest port number. Therefore, for example the case of deciding the third frame of the channel having multiple counters C2–Cn with count value "1" in FIG. 12, the channel connected to the output ports $70_{OUT2}$–$70_{OUTn}$ with the smallest port number of the selector 70 among the channels corresponding to these counters C2–Cn is decided as the channel to which the image data D1A–D1m is output next.

And the controller 73 sequentially decides the channel to which one frame of the image data D1A–D1m is output, controls the multiplexer 71 based on the decision result as mentioned above, and provides the tag information D11 based on the decision result to the tag encoder 72 by conducting above-mentioned channel deciding processing at every arrival of the falling period of the vertical synchronizing signal $S_{VSINK1}$.

Figure 13:
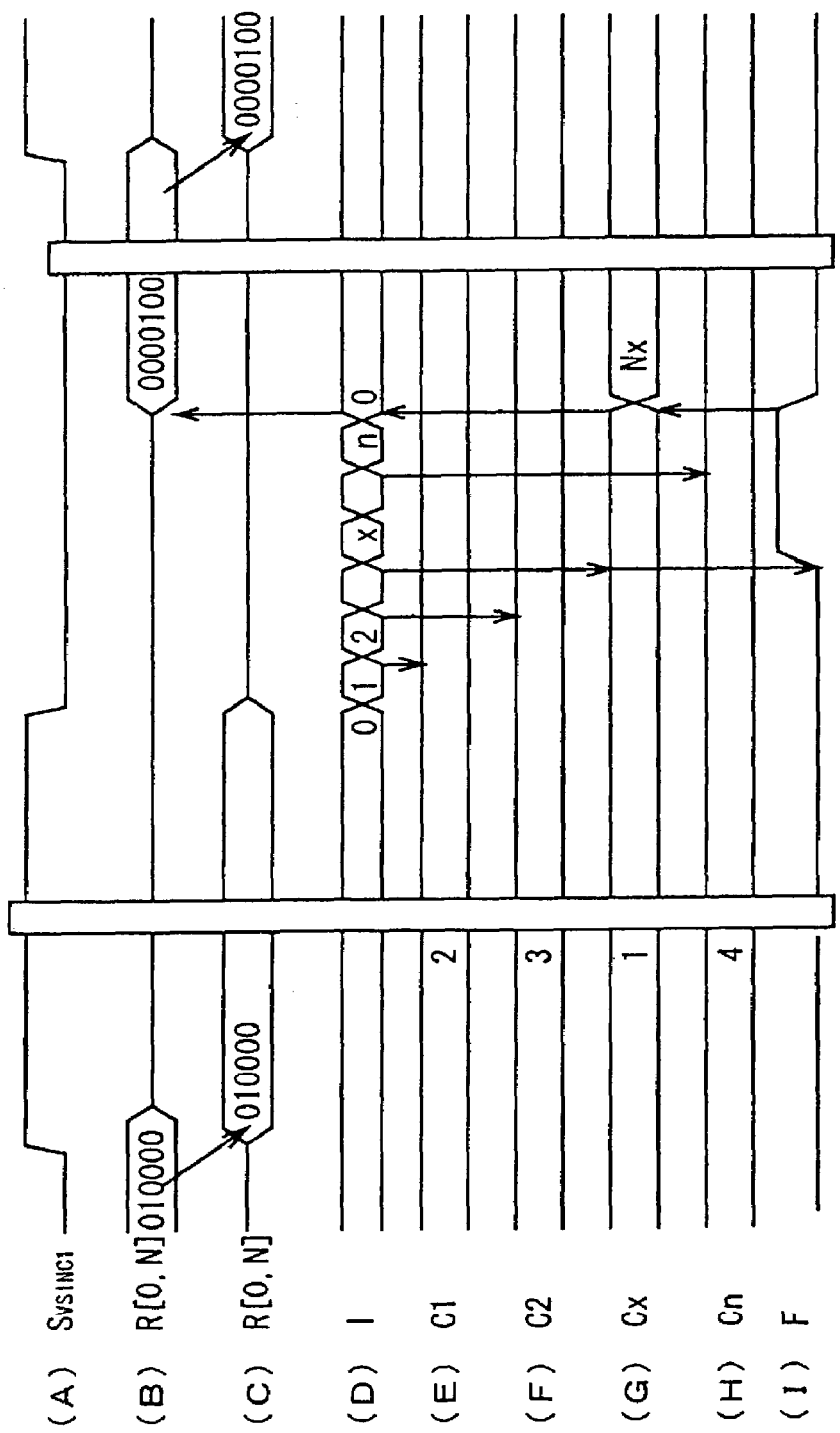
FIG. 13 is a schematic diagram explaining a decision method of an output channel based on output frequency.

FIG. 13 is a signal diagram showing above-mentioned channel deciding processing at a signal level.

(2-2-3) Multiplexing Processing Procedure

Figure 14:
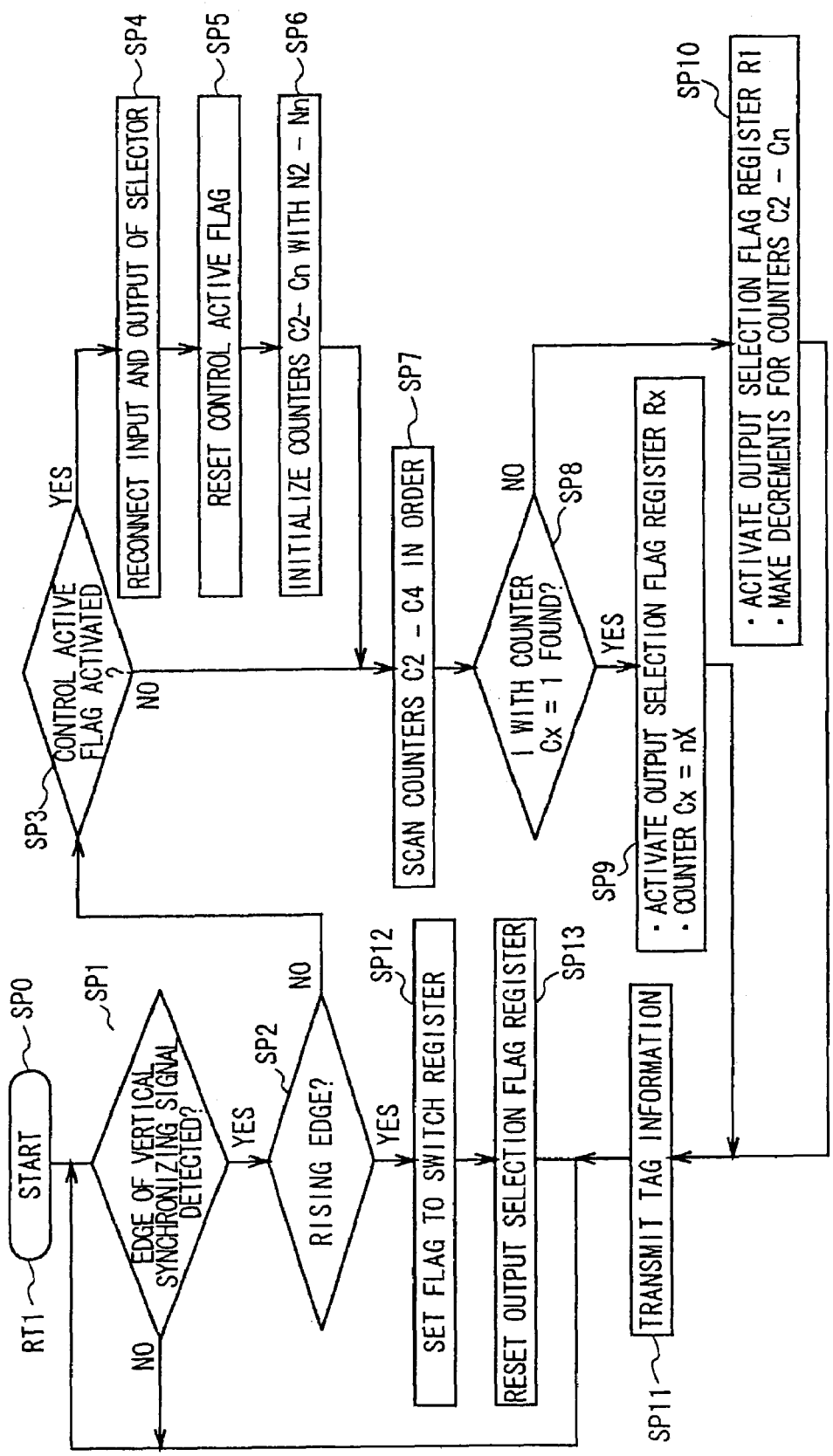
FIG. 14 is a flowchart of multiplexing processing procedure.

Here, a series of the procedures of the controller 73 are conducted by following the multiplexing processing procedure RT1 shown in FIG. 14.

In actually, the controller 73, in the initial condition, controls the selector 70 base on the output selection control information D12 previously provided from the upper controller, then starts the multiplexing processing procedure RT1 at step SP0 after connecting the input ports $70_{IN1}$–$70_{INm}$ and the output ports $70_{OUT2}$–$70_{OUTn}$, monitors the provided vertical synchronizing signal $S_{VSINK1}$ at the following step SP1, and waits for the detection of a rising edge or a falling edge of the vertical synchronizing signal $S_{VSINK1}$.

The controller 73 gets a positive result at step SP1 by the arrival of the rising or falling edge of the vertical synchronizing signal $S_{VSINK1}$, then goes to step SP2 to judge whether the edge is a rising edge or not.

Then, the controller 73 goes to step SP3 with a negative result at this step SP2, then decides the channel to be output during the coming rising period of the vertical synchronizing signal $S_{VSINK1}$ at following steps SP3–SP11 as well as executes various types of processing based on the decision result.

In other words, the controller 73 firstly judges at step SP3 whether the control active flag is stored in the control active flag register 91 (FIG. 7) or not, then goes to step SP7 with a negative result.

On the other hand, the controller 73 goes to step SP4 with a positive result at this step SP3, then controls the selector 70 based on a new output selection control information D12 stored in the image select register 90 (FIG. 7), then reconnects designated each of the input ports $70_{IN1}$–$70_{INm}$ and the output ports $70_{OUT1}$–$70_{OUTn}$ of the selector 70.

Following above, the controller 73 goes to step SP5 and resets the control active flag stored in the control active flag register 91 and goes to step SP6 and initializes the count value of each of the counters C1–Cn (FIG. 7) base on the new output selection control information D12, then goes to step SP7.

Then, the controller 73 reads each of the present counters C2–Cn in order at SP7, and judges whether count value "1" is in the counters C2–Cn at the following step SP8.

The controller 73 goes to step SP9 with a positive result at step SP8, decides the channel to be output during the coming rising period of vertical synchronizing signal $S_{VSINK1}$ corresponding to the counters C2–Cn, and stores the flag in the one bit memory domain $92_1$–$92_n$ of the output selection flag register 92 (FIG. 7) corresponding to the counters C2–Cn based on the decision result as well as resets the count values of the counters C2–Cn to the initial values, then goes to step SP11.

On the other hand, the controller 73 goes to step SP10 with a negative result at step SP9, decides the channel connected to the output port $70_{OUT1}$ with port number "1" of the selector 70 as the channel to be output during the coming rising period of the vertical synchronizing signal $S_{VSINK1}$, and stores the flag in the one bit memory domain $92_1$–$92_n$ of the output selection flag register 92 (FIG. 7) corresponding to the channel based on the decision result as well as makes one by one decrements of the count values of the counters C2–Cn except for the counter C1 corresponding to the channel, then goes to step SP11.

Following above, the controller 73 provides this tag information D11 (FIG. 7) based on the decision result to the tag encoder 72 via the tag information storing register 93 (FIG. 7). Then the controller 73 goes back to step SP1 and waits for the detection of the next rising edge or the falling edge of the vertical synchronizing signal $S_{VSINK1}$.

When the controller 73 detects the rising edge of the vertical synchronizing signal $S_{VSINK1}$ at step SP1, the controller 73 goes to step SP12 through step SP2 and stores the flag in the corresponding one bit memory domain $81_1$–$81_n$ in the switch memory 81 (FIG. 7) of the multiplexer 71 based on the flag stored in one of the one bit memory domain $92_1$–$92_n$ in the output selection flag register 92.

Furthermore, the controller 73 resets the output selection flag register 92 at the following step SP13, then goes back to step SP1 and repeats the processing same as above-mentioned.

As described above, the controller 73 controls the multiplexer 71 and the tag encoder 72 based on the output selection control information D12 provided from the upper controller, so that the image data D1A–D1m of each channel are multiplexed at the designated output frequency by frame.

(2-3) Detailed Construction of the Restoring Part 67 at the Image Receiving Unit 61 (FIG. 6)

(2-3-1) Detailed Construction of the Restoring Part 67 in the Image Receiving Unit 61

Figure 15:
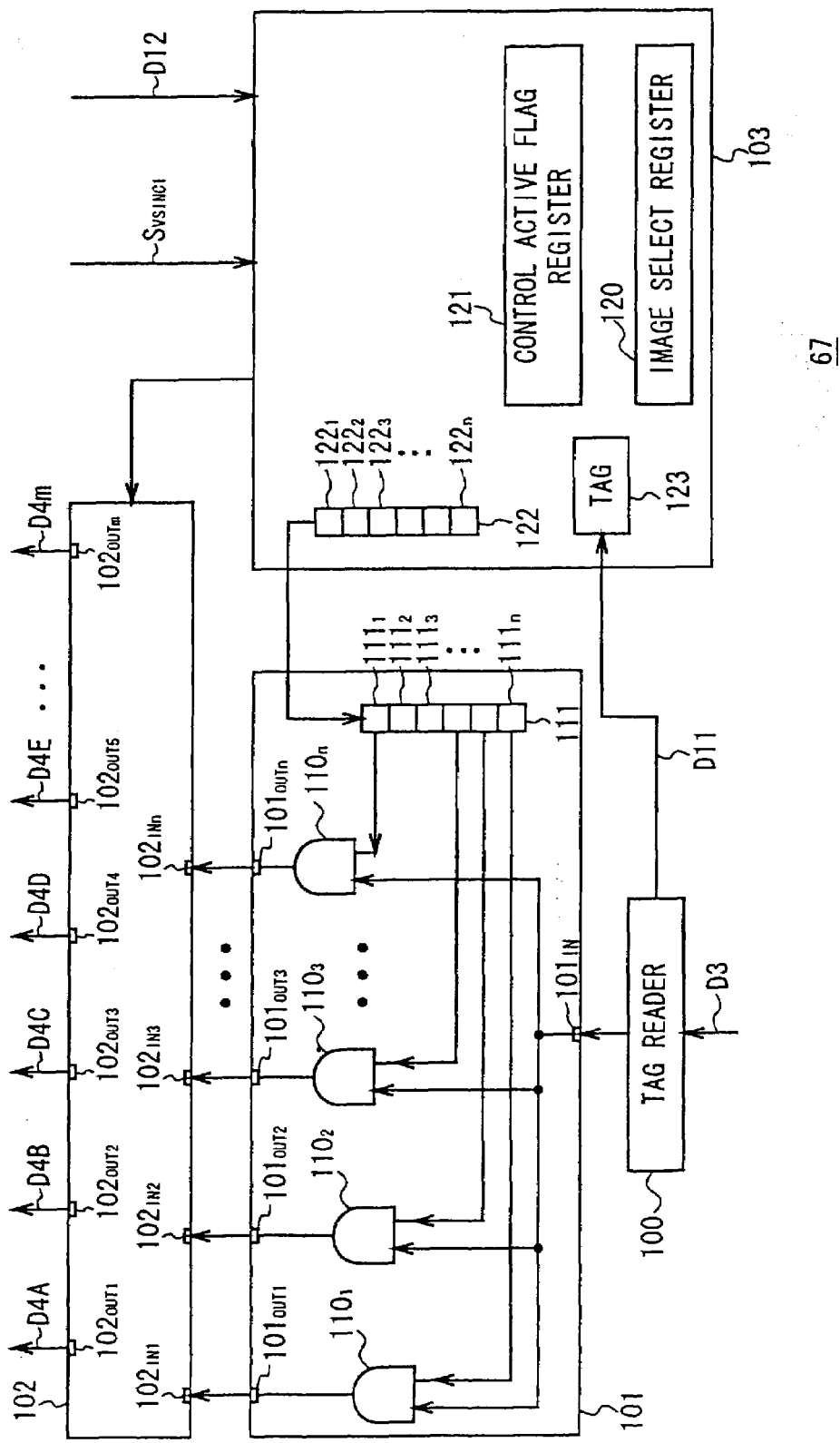
FIG. 15 is a block diagram showing a detailed construction of a restoring part of an image receiving unit.

FIG. 15 shows the detailed construction of the restoring part 67 in the image receiving unit 61 (FIG. 6). As is obvious from this FIG. 15, the restoring part 67 is comprised of a tag reader 100, a demultiplexer 101, a selector 102, and a controller 103.

The tag reader 100 has one frame of the frame memory (not shown in Figs.), and buffers the tag information adding multiplexing data D3 provided from the receiving part 66 (FIG. 6) by frame as well as reads and delivers the above-mentioned tag information D11 (FIG. 7) added to the buffered one frame of the tag information adding multiplexing data D3 (one frame of the image data D1A–D1m (FIG. 7)) to the controller 103.

The tag reader 100 delivers one frame of the tag information adding multiplexing data D3 (one frame of the image data D1A–D1m), from which this tag information D11 is read out, to the demultiplexer 101 at every arrival of the rising period of the vertical synchronizing signal $S_{VSINK1}$ provided also to the image receiving unit 61 from above-mentioned CCD cameras 50A and 50B.

The demultiplexer 101 has a plurality of output ports $101_{OUT1}$–$101_{OUTn}$ disposed corresponding to each of the input ports $71_{IN1}$–$71_{INn}$ of the multiplexer 71 (FIG. 7) of the image transmitting unit 51 (FIG. 6), a plurality of AND circuits $110_1$–$110_n$ disposed corresponding to each of the output ports $101_{OUT1}$–$101_{OUTn}$, and a switch memory 111 in which a plurality of one bit memory domain $111_1$–$111_n$ are disposed corresponding to each of these AND circuits $110_1$–$110_n$. Each of these output ports $101_{OUT1}$–$101_{OUTn}$ of the demultiplexer 101 is connected to the corresponding signal output terminal of the AND circuits $110_1$–$110_n$ while the first signal input terminal of each of these AND circuits $110_1$–$110_n$ is connected to the corresponding one bit memory domain $111_1$–$111_n$ in the switch memory 111, and the second signal input terminal is connected to the input port $101_{IN}$ of the demultiplexer 101 respectively.

In this case, the flag is stored in one of the one bit memory domain $111_1$–$111_n$ of the switch memory 111 of the demultiplexer 101 by the controller 103. This flag is updated at every arrival of the rising period of the vertical synchronizing signal $S_{VSINK1}$ for the first timing, is stored only in the one bit memory domain $111_1$–$111_n$ connected to one of the output ports $101_{OUT1}$–$101_{OUTn}$ decided as the output ports $101_{OUT1}$–$101_{OUTn}$ of the demultiplexer 101 to which the controller 103 is expected to output next image data D1A–D1m during the falling period of the last vertical synchronizing signal $S_{VSINK1}$.

In this manner, in the demultiplexer 101 during the rising period of the vertical synchronizing signal $S_{VSINK1}$, only the AND circuits $110_1$–$110_n$ connected to one bit memory domain $111_1$–$111_n$ in which the flag of the switch memory 111 is stored validly operate, and one frame of the tag information adding multiplexing data D3 (one frame of the image data D1A–D1m) provided from the tag reader 100 is delivered to the selector 102 only via the validly operating AND circuits $110_1$–$110_n$, and the output ports $101_{OUT1}$–$101_{OUTn}$ connected to the validly operating AND circuits $110_1$–$110_n$.

The selector 102 has a plurality of input ports $102_{IN1}$–$102_{INn}$ disposed corresponding to each of the output ports $70_{OUT1}$–$70_{OUTn}$ (FIG. 6) of the selector 70 (FIG. 6) of the image transmitting unit 51 (FIG. 5) and a plurality of the output ports $102_{OUT1}$–$102_{OUTm}$ disposed corresponding to each of the input ports $70_{IN1}$–$70_{INm}$ of the selector 70, and each of these input ports $102_{IN1}$–$102_{INn}$ is connected to the corresponding output ports $101_{OUT1}$–$101_{OUTn}$ of the demultiplexer 101.

And the selector 102, in the initial condition, connects the designated input ports $102_{IN1}$–$102_{INn}$ and the output ports $102_{OUT1}$–$102_{OUTm}$ under the control of the controller 103.

Accordingly, the selector 102 during the rising period of the vertical synchronizing signal $S_{VSINK1}$, outputs one frame of the tag information adding multiplexing data D3 (one frame of the image data D1A–D1m) output from one of the output ports $101_{OUT1}$–$101_{OUTn}$ of the demultiplexer 101 to the corresponding image processing parts 68A–68D of a subsequent stage as the image data D4A–D4m only via the input ports $102_{IN1}$–$102_{INn}$ of the selector 102 connected to the output ports $101_{OUT1}$–$101_{OUTn}$ and the output ports $102_{OUT1}$–$102_{OUTm}$ connected to the input ports $102_{IN1}$–$102_{INn}$.

On the other hand, the controller 103, as is obvious from FIG. 15, has an image select register 120 for memory holding the output selection control information D12, a control active flag register 121 for storing the control active flag, an output selection flag register 122 in which one bit memory domain $122_1$–$122_n$ is disposed corresponding to each of the one bit memory domain $111_1$–$111_n$ of the demultiplexer 101, and a tag information storing register 123 for temporally keeping the tag information D11 provided from the tag reader 100.

The controller 103 is provided with the above-mentioned output selection control information D12 provided to the controller 73 (FIG. 6) of the multiplexing part 63 of the image transmitting unit 51 (FIG. 5) from the upper controller, so that the controller 103 keeps the output selection control information D12 in the image select register 120 as a table shown in FIG. 10.

The controller 103, in the initial condition, controls the selector 102 based on the output selection control information D12 kept in the image select register 120, so that the designated input ports $102_{IN1}$–$102_{INn}$ and output ports $102_{OUT1}$–$102_{OUTm}$ of the selector 102 are connected.

In addition, the controller 103 temporally keeps the tag information D11 provided from the tag reader 100 in the tag information storing register 123 at every the tag reader 100's accumulating one frame of the tag information adding multiplexing data D3 (one frame of the image data D1A–D1m) in the internal frame memory, as well as analyzes the tag information D11 kept in the tag information storing register 123 at every arrival of the falling period of the vertical synchronizing signal $S_{VSINK1}$.

Then, the controller 103 decides the output ports $101_{OUT1}$–$101_{OUTn}$ of the demultiplexer 101 to which one frame of the tag information adding multiplexing data D3 (one frame of the image data D1A–D1m) is output during the coming rising period of the vertical synchronizing signal $S_{VSINK1}$, while comparing the connection relation between each of the input ports $102_{IN1}$–$102_{INn}$ and the output ports $102_{OUT1}$–$102_{OUTm}$ of the selector 102 obtained based on the tag information D11 with the connection relation between each of the input ports $102_{IN1}$–$102_{INn}$ and the output ports $102_{OUT1}$–$102_{OUTm}$ of the selector 102 obtained based on the output selection control information D12 kept in the image select register 120.

Then, the controller 103, while temporally keeping the flag based on the decision result in the corresponding one bit memory domain $122_1$–$122_n$ of the output selection flag register 122 during the falling period of the vertical synchronizing signal $S_{VSINK1}$, stores the flag in the corresponding one bit memory domain $111_1$–$111_n$ of the switch memory 111 of the demultiplexer 101 corresponding to the one bit memory domain $122_1$–$122_n$ in which the flag is stored immediately after the start-up of the next rising period of the vertical synchronizing signal $S_{VSINK1}$, and controls the tag reader to output one frame of the tag information adding multiplexing data D3 (one frame of the image data D1A–D1m) presently accumulated, so that one frame of the tag information adding multiplexing data D3 is output from the output ports $101_{OUT1}$–$101_{OUTn}$ decided by the demultiplexer 101.

Furthermore, when a command to update the output selection control information D12 and the corresponding new output selection control information D12 are provided from the upper controller, the controller 103 stores the control active flag into the control active flag register 121 as well as updates the output selection control information D12 kept in the image select register 120 to the new output selection control information D12.

Then, the controller 103 controls the selector 102 based on the new output selection control information D12 stored in the image select register 120, corresponding to the control active flag's being stored in the control active flag register 121 during the following falling period of the vertical synchronizing signal $S_{VSINK1}$, so that the controller 103 connects each of the designated input ports $102_{IN1}$–$102_{INn}$ and the output ports $102_{OUT1}$–$102_{OUTm}$ of the selector 102 and controls the tag reader 100 and the demultiplexer 101 based on the new output selection control information D12 in the same manner as above-mentioned.

(2-3-2) Restoration Processing Procedure

Figure 16:
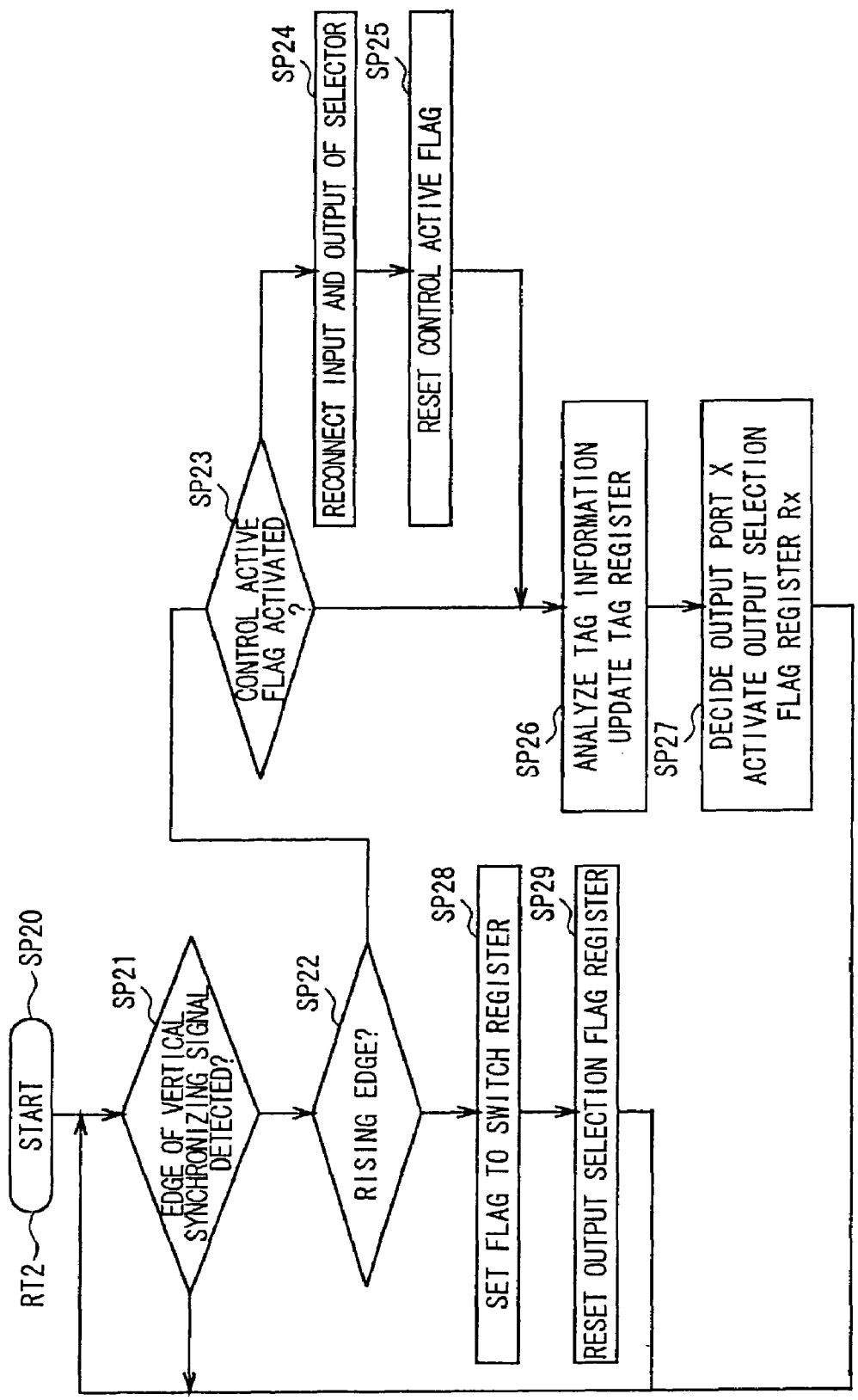
FIG. 16 is a flowchart of a restoration processing procedure.

Here, a series of the above-mentioned processing of the controller 103 are conducted by following the restoration processing procedure RT2 shown in FIG. 16.

In actually, the controller 103, in the initial condition, controls the selector 102 based on the output selection control information D12 from the upper controller, so that the controller 103 starts the restoration processing procedure RT2 at step SP20 after connecting each of the designated input ports $102_{IN1}$–$102_{INn}$ and the output ports $102_{OUT1}$–$102_{OUTm}$ of the selector 102, monitors the above-mentioned vertical synchronizing signal $S_{VSINK1}$ at the following step SP21, and waits for the detection of the rising edge or the falling edge of vertical synchronizing signal $S_{VSINK1}$.

Then, when a positive result at the arrival of the rising or falling edge of the vertical synchronizing signal $S_{VSINK1}$ is got at step SP21, the controller 103 goes to step SP22 and judges whether the edge is the rising edge or not.

Following above, the controller 103 goes to step SP23 with a negative result at SP22, then, at steps SP23–SP27, decides the output ports $101_{OUT1}$–$101_{OUTn}$ of the demultiplexer 101 to which one frame of the tag information adding multiplexing data D3 (one frame of the image data D1A–D1m) is output during the coming rising period of the vertical synchronizing signal $S_{VSINK1}$ as well as executes various types of processing based on the decision result.

In other words, the controller 103 at step SP23 judges whether the control active flag is stored in the control active flag register 121 (FIG. 15) or not, then goes to step SP26 with a negative result.

On the other hand, the controller 103 goes to step SP24 with a positive result at step SP23 and controls the selector 102 based on the new output selection control information D12 stored in the image select register 120 (FIG. 15), so that each of the designated input ports $102_{IN1}$–$102_{INn}$ and the output ports $102_{OUT1}$–$102_{OUTm}$ of the selector 102 are connected, and the control active flag stored in the control active flag register 121 is reset at the following step SP25, then the controller 103 goes to step SP26.

Then the controller 103, at step SP26, analyzes the tag information D11 stored in the tag information storing register 123 (FIG. 15) as well as updates the present tag information D11 to the new tag information D11 provided from the tag reader 100 in the mean time.

Furthermore, the controller 103 goes to step SP27, decides the output ports $101_{OUT1}$–$101_{OUTn}$ of the demultiplexer 101 to which one frame of the tag information adding multiplexing data D3 (one frame of the image data D1A–D1m) during the coming rising period of the vertical synchronizing signal $S_{VSINK1}$ based on the analysis result of the tag information D11 at step SP26 and the output selection control information D12 stored in the image select register 120, and stores the flag in the one bit memory domain $122_1$–$122_n$ of the output selection flag register 122 corresponding to the output ports $101_{OUT1}$–$101_{OUTn}$ based on the decision result, then goes back to step SP21.

Then, the controller 103 goes to step SP28 through step SP22 with the detection of the rising edge of the vertical synchronizing signal $S_{VSINK1}$ at step SP21, and stores the flag in the one bit memory domain $111_1$–$111_n$ of the switch memory 111 of the demultiplexer 101 corresponding to the one bit memory domain $122_1$–$122_n$ in which the flag is stored in the output selection flag register 122.

Furthermore, the controller 103 resets the flag in the output selection flag register 122 at the following step SP29, then goes back to step SP21 and repeats the processing same as above-mentioned.

As described above, the controller 103 controls the tag reader 100, the demultiplexer 101, and the selector 102 based on the tag information D11 embedded in the tag information adding multiplexing data D3 and the output selection control information D12 provided from the upper controller, so that each one frame of the image data D1A–D1m comprising the tag information adding multiplexing data D3 is allocated for each channel.

(3) Operation and Effect of This Embodiment

In the above construction, the image transmission system 60 of the robot 1 at the image transmitting unit 51, multiplexes the image data D1A–D1m of the multiple channels to be input with switching the channels by frame and adds the tag information D11 to each frame of the multiplexed image data D1A–D1m, while at the image receiving unit 61, the image transmission system 60 of the robot 1 analyzes the tag information D11 added to each frame of the image data D1A–D1m transmitted from the image transmitting unit 51 and outputs the multiplexed image data D1A–D1m transmitted from the image transmitting unit 51 with dividing by frame to the corresponding channel.

Subsequently, in this image transmission system 60, since the image data D1A–D1m of the multiple channels can be transmitted via single transmission line without format modification, no additional wiring is required to increase the image data D1A–D1m to be input to the image transmitting unit 51, which makes such increase easy.

Furthermore, in this image transmission system 60, the output ratio of the image data D1A–D1m for each of the channels can be specifically configured since the output frequency to be used when the controller 73 of the multiplexing part 63 (FIG. 7) of the image transmitting unit 51 decides the channel to be output next is configured to be shown as the number of the output frames of the channel for the number of the input frames of the image data D1A of the standard channel as above described. In addition, in this image transmission system 60, the ratio of the output of the other channels for the standard channel can be guaranteed since the output of the image data D1A–D1m of each of the channels are controlled based on the output frequency as described in FIGS. 11 and 12.

In the above construction, the image transmitting unit 51 multiplexes the image data D1A–D1m of the multiple channels to be input with switching the channels by frame and adds the tag information D11 to each frame of the multiplexed image data D1A–D1m, while the image receiving unit 61 analyzes the tag information D11 added to each frame of the image data D1A–D1m transmitted from the image transmitting unit 51 and outputs the multiplexed image data D1A–D1m transmitted from the image transmitting unit 51 with dividing by frame to the corresponding channel, so that the image data D1A–D1m of the multiple channels can be transmitted via single transmission line without format modification. Therefore, an image transmission system which is capable of efficiently transmitting the image data D1A–D1m of multiple channels can be realized by using the existing system formed on the premise of transmitting and receiving the image data through a single transmission line.

(4) Other Embodiments

In the above embodiment, the present invention is applied to the robot 1 so configured as shown in FIGS. 1–5, however, this invention is not limited to the above embodiment, and can be applied to various types of robot apparatus, and can be widely applied to, other than robot apparatus, various image transmission devices, transmitting devices, or receiving devices which are configured to transmit image data of multiple channels.

Furthermore, in the above embodiment, the multiplexer 71 and the controller 73 are constructed, as shown in FIG. 7, as the multiplexing means for multiplexing the image data D1A–D1m of multiple channels to be input with switching the channels by frame in the multiplexing part 63 of the image transmitting unit 51, however, the present invention is not limited to the above embodiment, and can be applied to various constructions.

Still further, in the above embodiment, in the multiplexing part 63 of the image transmitting unit 51, the tag encoder 72 as an image information adding means for adding the tag information D11 (image information) to each of the image data D1A–D1m for each frame multiplexed by the multiplexer 71, as shown in FIG. 8, embeds the data of the tag information D11 at the four continuing pixel positions at the bottom of the left edge in the image. However, this invention is not limited to the above embodiment, and the tag information D11 can be embedded in other positions and can be added to the image data D1A–D1m by other methods. Also, for example in existing text broadcasting, the tag information D11 can be superposed on a vertical retrace line period portion of the image data D1A–D1m.

In addition, in the above embodiment, in the restoring part 67 of the image receiving unit 61, the controller 103 as an analyzing means for analyzing the tag information D11 added to each of the image data D1A–D1m for each frame transmitted from the image transmitting unit 51 controls the demultiplexer 101 and the selector 102 based on the tag information and the output selection control information provided from the upper controller. However, the present invention is not limited to the above embodiment, and for example, the demultiplexer 101 and the selector 102 can be controlled based only on the tag information D11 read from the image data D1A–D1m.

Furthermore, in the above embodiment, in the restoring part 67 of the image receiving unit 61, the dividing means for dividing by frame and outputting each of the image data D1A–D1m for each frame transmitted from the image transmitting unit 51 to the corresponding channels is comprised of the demultiplexer 101 the selector 102, and the controller 103 so configured as FIG. 15, however, the present invention is not limited to the above embodiment, and can be applied to various constructions.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image transmission device transmitting image data of multiple channels, comprising:
   transmitting means for multiplexing and transmitting said image data of each said channel; and
   receiving means for dividing and outputting said image data multiplexed by and transmitted from said transmitting means into corresponding said channels, wherein:

said transmitting means comprises:

multiplexing means for multiplexing said image data of each said channel to be input with switching said channels by frame, and image information adding means for adding prescribed image information to said image data of each said frame multiplexed by said multiplexing means based on an output frequency comprised of a frequency for each channel to be transmitted;

wherein the multiplexing means multiplexes the image data of each prescribed channel by switching the channels by frame and synchronizing each channel with a prescribed frame synchronization signal;

wherein said output frequency represents the number of output frames of said channels for the number of input frames of said image data of said channels being a standard; and said receiving means comprises analyzing means for analyzing said image information added to said image data of each said frame transmitted from said transmitting means, and dividing means for dividing for each said frame and outputting said multiplexed image data transmitted from said transmitting means into corresponding said channels based on analysis result of said analyzing means.

2. The image transmission device according to claim 1, wherein said multiplexing means of said transmitting means multiplexes, based on control information prescribed of previously provided said channels to be transmitted.

3. The image transmission device according to claim 1, wherein said dividing means of said receiving means decides channels to be output of said multiplexed image data transmitted from said transmitting means for each said frame based on analysis result of said analyzing means, and divides said multiplexed image data for each said frame by synchronizing with prescribed frame synchronization signal based on said decision result.

* * * * *